(12) United States Patent
Mizrahi et al.

(10) Patent No.: US 9,005,768 B2
(45) Date of Patent: Apr. 14, 2015

(54) COMPOSITE MATERIALS INCLUDING REGIONS DIFFERING IN PROPERTIES AND METHODS

(75) Inventors: Shimon Mizrahi, Haifa (IL); Eyal Mizrahi, West Bloomfield, MI (US)

(73) Assignee: Productive Research, Farmington Hills, MI (US)

( * ) Notice: Subject to any disclaimer, the term of this patent is extended or adjusted under 35 U.S.C. 154(b) by 368 days.

(21) Appl. No.: 13/399,459

(22) Filed: Feb. 17, 2012

(65) Prior Publication Data

US 2012/0214018 A1    Aug. 23, 2012

Related U.S. Application Data

(60) Provisional application No. 61/444,942, filed on Feb. 21, 2011.

(51) Int. Cl.
| | |
|---|---|
| *B32B 5/14* | (2006.01) |
| *B32B 15/08* | (2006.01) |
| *B32B 5/16* | (2006.01) |
| *B32B 3/18* | (2006.01) |
| *B29C 45/14* | (2006.01) |

(52) U.S. Cl.
CPC . *B32B 15/08* (2013.01); *B32B 5/16* (2013.01); *B32B 3/18* (2013.01); *B29C 2045/14532* (2013.01); *B32B 2262/103* (2013.01); *B32B 2605/08* (2013.01)

(58) Field of Classification Search
USPC .............................. 428/59, 600; 52/419, 432
See application file for complete search history.

(56) References Cited

U.S. PATENT DOCUMENTS

| | | | |
|---|---|---|---|
| 213,015 | A | 3/1879 | Wahl et al. |
| 777,656 | A | 12/1904 | Banning |
| 1,972,835 | A | 9/1934 | Tainton |
| 2,286,980 | A | 6/1942 | Schanz |

(Continued)

FOREIGN PATENT DOCUMENTS

| | | |
|---|---|---|
| CA | 2700549 A1 | 4/2009 |
| CH | 284305 | 7/1952 |

(Continued)

OTHER PUBLICATIONS

"The Effect of Electrical Resistance on Nugget Formation During Spot Welding", J.G. Kaiser, G.J. Dunn, and T.W. Eagar, Welding Research Supplement, Jun. 1982, pp. 167-s to 174-s.

(Continued)

*Primary Examiner* — Adam Krupicka
(74) *Attorney, Agent, or Firm* — The Dobrusin Law Firm, PC

(57) ABSTRACT

The invention is directed at composite materials, articles including the composite materials, and methods for producing and using them. The composite material includes regions that differ in one or more properties. The composite material generally includes a first metallic sheet, a second metallic sheet; one or more metallic inserts interposed between the first and second metallic sheets; and a polymeric layer (e.g., a core layer) interposed between the first and second metallic sheets. The polymeric layer preferably includes a thermoplastic polymer. Preferably, the composite material includes a first region having an insert interposed between the metallic sheets so that the first region (relative to the second region) has a high tensile strength, a high thickness, a high density, or any combination thereof.

19 Claims, 4 Drawing Sheets

(56) References Cited

U.S. PATENT DOCUMENTS

| | | | |
|---|---|---|---|
| 3,086,899 A | 4/1963 | Smith et al. |
| 3,112,213 A | 11/1963 | Lusa |
| 3,205,337 A | 9/1965 | Hiemenz |
| 3,764,277 A | 10/1973 | Hollis |
| 3,832,433 A | 8/1974 | Schaffer et al. |
| 3,948,614 A | 4/1976 | Michalon |
| 4,037,073 A | 7/1977 | Becker |
| 4,048,355 A | 9/1977 | Sakayori et al. |
| 4,110,117 A | 8/1978 | McLeod |
| 4,110,505 A | 8/1978 | Prewo |
| 4,171,394 A | 10/1979 | Patil et al. |
| 4,255,482 A | 3/1981 | Udagawa |
| 4,267,679 A | 5/1981 | Thompson |
| 4,313,996 A | 2/1982 | Newman et al. |
| 4,329,561 A | 5/1982 | Schafer et al. |
| 4,330,587 A | 5/1982 | Woodbrey |
| 4,353,951 A | 10/1982 | Yukitoshi et al. |
| 4,369,222 A | 1/1983 | Hedrick et al. |
| 4,383,942 A | 5/1983 | Davenport |
| 4,421,892 A | 12/1983 | Kasahara et al. |
| 4,424,254 A | 1/1984 | Hedrick et al. |
| 4,429,076 A | 1/1984 | Saito et al. |
| 4,461,665 A | 7/1984 | Schertler |
| 4,482,600 A | 11/1984 | Matsumoto et al. |
| 4,513,033 A | 4/1985 | Patil et al. |
| 4,522,875 A | 6/1985 | Still, Jr. et al. |
| 4,601,941 A | 7/1986 | Lutz et al. |
| 4,650,723 A | 3/1987 | Furuya |
| 4,650,951 A | 3/1987 | Koga et al. |
| 4,668,545 A | 5/1987 | Lowe |
| 4,678,707 A | 7/1987 | Shinozaki et al. |
| 4,690,856 A | 9/1987 | Ito et al. |
| 4,749,623 A | 6/1988 | Endo et al. |
| 4,753,850 A | 6/1988 | Ibe et al. |
| 4,758,627 A | 7/1988 | Wilkus et al. |
| 4,759,972 A | 7/1988 | Yoshiga et al. |
| 4,759,994 A | 7/1988 | Lesourd |
| 4,792,499 A | 12/1988 | Shindou et al. |
| 4,794,050 A | 12/1988 | Campbell et al. |
| 4,873,149 A | 10/1989 | Shinoda et al. |
| 4,888,247 A | 12/1989 | Zweben et al. |
| 4,978,582 A | 12/1990 | Stamm et al. |
| 5,030,488 A | 7/1991 | Sobolev |
| 5,030,816 A | 7/1991 | Strecker |
| 5,047,479 A | 9/1991 | Ohmae et al. |
| 5,061,778 A | 10/1991 | Uchida et al. |
| 5,063,098 A | 11/1991 | Niwa et al. |
| 5,084,357 A | 1/1992 | Imai et al. |
| 5,093,204 A | 3/1992 | Watanabe et al. |
| 5,100,737 A | 3/1992 | Colombier et al. |
| 5,216,075 A | 6/1993 | Papazoglou |
| 5,219,629 A | 6/1993 | Sobolev |
| 5,227,216 A | 7/1993 | Pettit |
| 5,278,231 A | 1/1994 | Chundury |
| 5,347,099 A | 9/1994 | Gissinger et al. |
| 5,410,133 A | 4/1995 | Matsen et al. |
| 5,418,073 A | 5/1995 | Loth et al. |
| 5,489,180 A | 2/1996 | Ichihara et al. |
| 5,518,836 A | 5/1996 | McCullough |
| 5,548,027 A | 8/1996 | Heucher et al. |
| 5,578,384 A | 11/1996 | Kingston |
| 5,604,033 A | 2/1997 | Arthurs et al. |
| 5,679,441 A | 10/1997 | Saelens et al. |
| 5,691,037 A | 11/1997 | McCutcheon et al. |
| 5,753,885 A | 5/1998 | Iwasa et al. |
| 5,846,461 A | 12/1998 | Collins et al. |
| 5,866,868 A | 2/1999 | Hirane |
| 5,894,045 A | 4/1999 | Desrondiers |
| 5,939,213 A | 8/1999 | Bowden et al. |
| 5,939,512 A | 8/1999 | Gervasi et al. |
| 5,951,800 A | 9/1999 | Pettit |
| 6,126,865 A | 10/2000 | Haak et al. |
| 6,146,488 A | 11/2000 | Okada et al. |
| 6,202,462 B1 | 3/2001 | Hansen et al. |
| 6,268,408 B1 | 7/2001 | Dispenza |
| 6,346,292 B1 | 2/2002 | Grubb et al. |
| 6,387,535 B1 | 5/2002 | Mantel |
| 6,428,905 B1 | 8/2002 | Behr et al. |
| 6,455,148 B1 | 9/2002 | Spears et al. |
| 6,465,110 B1 | 10/2002 | Boss et al. |
| 6,534,194 B2 | 3/2003 | Weihs et al. |
| 6,592,968 B1 | 7/2003 | Schmit et al. |
| 6,673,468 B1 * | 1/2004 | Behr et al. ............... 428/626 |
| 6,764,772 B2 | 7/2004 | Clyne et al. |
| 6,841,212 B2 | 1/2005 | Bicakci-Jenkins et al. |
| 6,841,252 B2 | 1/2005 | Kroes et al. |
| 6,861,156 B2 | 3/2005 | Palm |
| 6,957,848 B2 | 10/2005 | Walther |
| 7,062,853 B2 | 6/2006 | Reed et al. |
| 7,157,140 B1 | 1/2007 | Hoppe et al. |
| 7,390,564 B2 | 6/2008 | Yuasa et al. |
| 7,510,621 B2 * | 3/2009 | Sigler et al. ............... 156/273.9 |
| 7,543,384 B2 | 6/2009 | Ni et al. |
| 7,592,388 B2 | 9/2009 | Wick et al. |
| 7,648,058 B2 | 1/2010 | Straza |
| 7,927,708 B2 | 4/2011 | Mizrahi |
| 2002/0160180 A1 | 10/2002 | Yamamoto et al. |
| 2003/0064241 A1 | 4/2003 | Suzuki et al. |
| 2003/0082335 A1 | 5/2003 | Clyne et al. |
| 2003/0099857 A1 | 5/2003 | Nomura et al. |
| 2004/0116602 A1 | 6/2004 | Botros |
| 2004/0244789 A1 | 12/2004 | Jentgens |
| 2004/0247927 A1 | 12/2004 | Kurz |
| 2005/0000947 A1 | 1/2005 | Sigler |
| 2005/0133575 A1 | 6/2005 | Gayden et al. |
| 2005/0214553 A1 | 9/2005 | Yannetti et al. |
| 2006/0010807 A1 | 1/2006 | Whitley |
| 2006/0060296 A1 | 3/2006 | Sigler et al. |
| 2006/0062977 A1 | 3/2006 | Sigler et al. |
| 2006/0134395 A1 | 6/2006 | Sigler et al. |
| 2006/0134449 A1 | 6/2006 | Sigler et al. |
| 2006/0134450 A1 | 6/2006 | Sigler et al. |
| 2006/0222869 A1 | 10/2006 | Cai et al. |
| 2006/0269701 A1 | 11/2006 | Gauriat et al. |
| 2006/0286333 A1 | 12/2006 | Wang et al. |
| 2007/0062758 A1 | 3/2007 | Jensen et al. |
| 2007/0104966 A1 | 5/2007 | Calvez et al. |
| 2007/0186614 A1 | 8/2007 | Pinard |
| 2007/0187469 A1 | 8/2007 | Chen et al. |
| 2007/0196637 A1 | 8/2007 | Good et al. |
| 2007/0295704 A1 | 12/2007 | Sigler et al. |
| 2008/0081149 A1 | 4/2008 | Fuerst et al. |
| 2008/0311363 A1 | 12/2008 | Haskett et al. |
| 2009/0142538 A1 | 6/2009 | Sigler et al. |
| 2009/0226755 A1 | 9/2009 | Sigler et al. |
| 2009/0280348 A1 | 11/2009 | Patberg et al. |
| 2010/0035080 A1 | 2/2010 | Sigler et al. |
| 2010/0040902 A1 * | 2/2010 | Mizrahi ............... 428/600 |
| 2010/0084380 A1 | 4/2010 | Tezlaff et al. |
| 2010/0098929 A1 | 4/2010 | Dispenza |
| 2010/0196736 A1 | 8/2010 | Boger et al. |
| 2010/0233505 A1 | 9/2010 | Boger et al. |
| 2011/0162788 A1 | 7/2011 | Mizrahi |

FOREIGN PATENT DOCUMENTS

| | | |
|---|---|---|
| CH | 287794 | 12/1952 |
| CH | 406580 | 1/1966 |
| CN | 1649724 A | 8/2005 |
| DE | 877057 | 5/1953 |
| DE | 1912948 | 10/1970 |
| DE | 1729057 | 6/1971 |
| DE | 3622781 A1 | 1/1988 |
| DE | 4019202 A1 | 12/1991 |
| DE | 4141343 A1 | 5/1993 |
| DE | 4307563 A1 | 9/1993 |
| DE | 4300283 A1 | 7/1994 |
| DE | 19633306 A1 | 10/1997 |
| DE | 19724361 A1 | 1/1998 |
| DE | 19740844 A1 | 3/1999 |
| DE | 19810706 A1 | 9/1999 |
| DE | 19919783 | 11/2000 |
| DE | 19926379 A1 | 12/2000 |
| DE | 10011589 A1 | 9/2001 |

(56) References Cited

FOREIGN PATENT DOCUMENTS

| | | |
|---|---|---|
| DE | 10240384 A1 | 3/2004 |
| DE | 102004022677 A1 | 5/2004 |
| DE | 202004015784 | 4/2005 |
| DE | 102006013529 A1 | 10/2006 |
| DE | 102006049014 A1 | 4/2008 |
| DE | 102006049015 A1 | 4/2008 |
| EP | 19835 A1 | 12/1980 |
| EP | 69401 | 1/1983 |
| EP | 32355 B1 | 5/1984 |
| EP | 208443 | 6/1986 |
| EP | 249442 A2 | 12/1987 |
| EP | 311722 A1 | 4/1989 |
| EP | 322947 B1 | 7/1989 |
| EP | 335642 A2 | 10/1989 |
| EP | 354521 A2 | 2/1990 |
| EP | 356837 B1 | 3/1990 |
| EP | 642920 A2 | 3/1995 |
| EP | 888880 A1 | 1/1999 |
| EP | 1034920 | 9/2000 |
| EP | 1044796 A2 | 10/2000 |
| EP | 1095718 A1 | 5/2001 |
| EP | 1197323 A1 | 4/2002 |
| EP | 1491328 A1 | 12/2004 |
| EP | 1504892 A1 | 2/2005 |
| FR | 1245009 | 11/1960 |
| GB | 2062057 A | 5/1981 |
| GB | 2332875 A | 7/1999 |
| JP | 54-52182 A | 4/1979 |
| JP | 56132709 A | 10/1981 |
| JP | 61010445 A | 1/1986 |
| JP | 61029262 U | 7/1986 |
| JP | 63242536 A | 10/1988 |
| JP | H01-108207 A | 4/1989 |
| JP | 1154876 A1 | 6/1989 |
| JP | 01-263043 A | 10/1989 |
| JP | 2050827 A | 2/1990 |
| JP | 02-231134 A | 9/1990 |
| JP | 2297432 A | 12/1990 |
| JP | 03-193443 A | 8/1991 |
| JP | 04-077245 A | 3/1992 |
| JP | 04-094928 A | 3/1992 |
| JP | 04-282239 A | 7/1992 |
| JP | 05-039560 A | 2/1993 |
| JP | 05-039561 A | 2/1993 |
| JP | 5050553 A | 3/1993 |
| JP | 05-138802 A | 6/1993 |
| JP | 5-162237 A | 6/1993 |
| JP | 05-229054 A | 9/1993 |
| JP | 05-229055 A | 9/1993 |
| JP | 06-071806 A | 3/1994 |
| JP | 06-198802 A | 7/1994 |
| JP | 08-224827 A | 9/1996 |
| JP | 63-158242 A | 7/1998 |
| JP | 2000-263697 A | 9/2000 |
| JP | 2011192792 A | 7/2001 |
| NL | 8203423 A | 4/1984 |
| RU | 2149788 C1 | 5/2000 |
| WO | 95/27975 A1 | 10/1995 |
| WO | 99/46461 A1 | 9/1999 |
| WO | 00/13892 A1 | 3/2000 |
| WO | 03/037970 A1 | 5/2003 |
| WO | 2007/062061 A2 | 5/2007 |
| WO | 2009/027480 A1 | 3/2009 |
| WO | 2009/043777 A2 | 4/2009 |
| WO | 2009/135786 A1 | 11/2009 |
| WO | 2010/021899 A1 | 2/2010 |
| WO | 2011/100734 A1 | 8/2011 |
| WO | 2012/019115 A1 | 2/2012 |

OTHER PUBLICATIONS

Abstract for: Dunnand, M., et al., "USILIGHT: A cost effective solution to lighten cars", SAE Technical Paper Series, Apr. 3-6, 2006, pp. 1-10.
Abstract for: Guttman, H., et al. "Galfan—A new Coating for Automotive Tubing", SAE Technical Paper 860274, 1986.
Abstract for: Herrschaft, D. et al., "Galfan—A New Zinc-Alloy Coated Steel for Automotive Body Use", SAE Technical Paper 830517, 1983.
Abstract for: Murase, M., et al., "Development of vibration damping steel sheets for automobile oil pans", SAE Internation Congress and Exposition, Mar. 1-5, 1993; Paper No. 930023; Kawasaki Steel Corp.
Abstract for: Shimizu, T. et al., "Application of hot-dip Zn-6%Al-3%Mg Alloy Coated Steel Sheet to Automotive Body", SAE Technical Paper No. 2005-01-1330, SAE 2005 World Congress & Exhibition, Apr. 2005.
Abstract for: Welch, T. et al., "Cost and Performance Benefits for Laminated Steel Body", SAE Technical Paper 1999-01-1784, 1999.
Co-Pending U.S. Appl. No. 12/978,974, filed Dec. 27, 2010 by Mizrahi et al.
Co-Pending U.S. Appl. No. 13/027,423, filed Feb. 15, 2011 by Mizrahi et al.
Gunnink, J.W. GLARE: An Improved Damage Tolerance Material. Proc. 19th European Conference on materials for Aerospace Applications, Dec. 6-8, 2000, pp. 17-24.
Kim et al., "Formability of AA5182/polypropylene/AA5182 Sandwich Sheets", J. of Mat. Processing Tech., 139 (2003) 1-7.
Kim et al., "Forming and Failure Behaviour of Coated, Laminated and Sandwiched Sheet Metals: A Review", J. of Mat. Processing Tech., 63 (1997) 38-42.
Mohr et al. Development of Formable Sandwich Seets for Automotive Applications, Adv. Eng. Materials, 7 (2005) 243-246.
Office Action from the U.S. Patent Office for copending U.S. Appl. No. 13/027,423 dated Oct. 24, 2011.
Office Action from the US Patent Office for copending U.S. Appl. No. 13/052,292 dated Nov. 23, 2011.
Office Action from the U.S. Patent Office for copending U.S. Appl. No. 12/978,974 mailed on Jan. 24, 2012.
Office Action from the U.S. Patent Office for copending U.S. Appl. No. 13/027,423 mailed on Apr. 13, 2012.
Office Action from the US Patent Office for copending U.S. Appl. No. 13/052,292 mailed on Apr. 19, 2012.
PCT International Search Report, PCT/US2009/053676, Productive Research LLC, mailed Dec. 23, 2009.
PCT International Search Report, PCT/US2010/0062138, Productive Research LLC, mailed Mar. 18, 2011.
PCT International Search Report, PCT/US2011/024829, Productive Research LLC, mailed May 10, 2011.
PCT International Search Report, PCT/US2011/046778, Productive Research LLC, mailed Nov. 10, 2011.
International search report for copending PCT Patent Application PCT/US2012/025619 filed on Feb. 17, 2012 and mailed on May 29, 2012.
Copending PCT Patent Application PCT/US2012/025619 filed on Feb. 17, 2012.
Shinozaki et al. "Spot-Weldable Composite Damping Sheets" www.jfe-steel.co.jp/archives/ksc_giho/16-4/j16-288-295.pdf.
Weiss et al. "The Influence on Temperature on the Forming Behavior of Metal/Polymer Laminates in Sheet Metal Forming", Transactions of the ASME, 129 ( 2007) 530-537.
www.quietsteel.com/pressrelease-022003.html. MSC Engineered Materials and Solutions Group, "Quiet Steel™ Debuts on 2003 Cadillac (Feb. 20, 2003)".
Tailor Welded Blanks, I-Car Advantage Online, Dec. 6, 2004 (available at http://www.i-car.com/pdf/advantage/online/2004/120604.pdf.
Copending PCT patent application No. PCT/US2011/046778 filed on Aug. 5, 2011 and published as WO 2012/019115 A1 on Feb. 9, 2012 by Mizrahi et al.
Office Action for Copending U.S. Appl. No. 12/978,974, filed Dec. 27, 2010 dated Jun. 5, 2012.
Office Action for co-pending U.S. Appl. No. 13/027,423 dated Aug. 15, 2012.
Chinese Office Action dated Sep. 19, 2014 (Application No. 201280018239.0).

* cited by examiner

COMPOSITE MATERIALS INCLUDING REGIONS DIFFERING IN PROPERTIES AND METHODS

CLAIM OF BENEFIT OF FILING DATE

The present invention claims the benefit of the filing date of U.S. Provisional Patent Application 61/444,942, filed on Feb. 21, 2011; the contents of which is hereby incorporated by reference in its entirety.

FIELD OF THE INVENTION

The present invention relates generally to composite materials having a sandwich structure including a polymeric core interposed between two metal layers where the composite material includes regions having one or more different properties, process for manufacturing such composite material, process for producing parts include such composite material, and parts including such composite material.

BACKGROUND OF THE INVENTION

Numerous metal parts require regions that have relatively demanding properties and other regions having less demanding properties. To reduce the weight and/or material usage of the part, there have been various technologies for machining, cutting, or otherwise tailoring a monolithic metal part.

For example, recent developments in part weight reduction have been achieved by using tailor welded blanks that include metal of different thickness welded together along an edge. Examples of tailor welded blanks, methods of production, welding of such blanks and applications for tailor welded blanks are described in U.S. Pat. No. 7,062,853 (by Reed et al.), U.S. Pat. No. 6,957,848, (by Walther), and U.S. Pat. No. 7,543,384 (by Ni et al.), and in "Tailor Welded Blanks", I-Car Advantage Online, Dec. 6, 2004 (available at http://www.i-car.com/pdf/advantage/online/2004/120604.pdf), all incorporated herein by reference in their entirety.

Notwithstanding the weight reductions achieved in tailor welded blanks, there continues to be a need for a material system that can achieve further weight reductions, cost reductions, are easy to manufacture, are easy to processor, are easy to weld to other parts, or any combination thereof. There is also a need for such materials that have sound dampening properties, good corrosion resistance, can be easily formed (e.g., in one or more regions), or any combination thereof.

SUMMARY OF THE INVENTION

The present invention is predicated on the ability to design and manufacture a composite material that it includes regions having different properties. Preferably, the composite material may be employed in a part having varying performance requirements so that the weight of the part can be reduced (e.g. compared to a part formed of a monolithic metal) or so that such a part can be manufactured more easily or less costly.

In general, the teachings herein pertain to composite material comprising a core layer including a polymer sandwiched between two metal layers. The composite material preferably includes regions having different thickness, a region that includes an insert (e.g., and a different region that is free of the insert), or both.

In one aspect of the invention, the composite material is a light weight composite including: a first metallic sheet; a second metallic sheet; one or more metallic inserts interposed between the first metallic sheet and the second metallic sheet; and a polymeric layer interposed between the first metallic sheet and the second metallic sheet; wherein the polymeric layer includes a thermoplastic polymer; the light weight composite includes a first region having an insert interposed between the first metallic sheet, wherein the first region has a relatively high tensile strength, a relatively high thickness, or both; and the light weight composite includes a second region having a tensile strength less than the tensile strength of the first region, a thickness less than the thickness of the first region, or both.

Another aspect of the invention is direct at a method of producing the light weight composite, such as a composite according to the teachings herein, including the step of extruding a layer of the polymeric material, or the step of shaping a layer of the polymeric material in a mold.

Another aspect of the invention is directed at a method of forming a part or component including a step of deforming a composite material, such as a composite material according to the teachings herein.

The light weight composites according to the teachings herein may be capable of being deformed using a stamping process, may be capable of being welded using a resistance welding process, or both.

Another aspect of the invention is a part or component, such as an automotive part or component formed using a method according to the teachings herein and/or formed of a composite according to the teachings herein.

DETAILED DESCRIPTION

The light weight composites (i.e., heterogeneous light weight composites) according to the teachings herein are capable of meeting the needs of parts requiring regions having different performance properties, such as achieved using tailor-welded blanks having varying thicknesses. By employing novel composites having heterogeneous mechanical and/or physical properties, it is surprisingly possible to further reduce the weight of parts and or simplify manufacturing, compared for example to parts made using tailor-welded blanks. A variety of approaches may be employed to achieve the necessary heterogeneous properties. For example, the composite may employ one or more stiffening or strengthening components, the composite may employ one or more components that vary in thickness, the composite may employ different materials, or any combination thereof.

Figure 1:
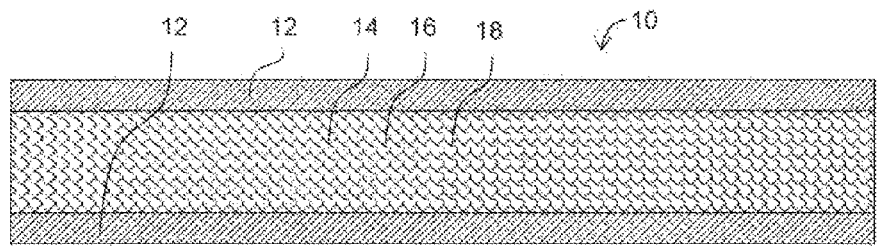
FIG. 1 is a drawing of an illustrative composite having generally homogeneous properties and generally uniform thickness.

The light weight composites according to the teachings herein differ from other composites having generally uniform thickness and generally uniform properties, such as the composite 10 illustrated in FIG. 1. For example, composites having generally homogeneous properties have been described, see for example International Patent Application Publications WO 2010/021899 and WO2011/100734 (filed Feb. 15, 2011) and International Patent Application PCT/US11/45778 (filed on Aug. 15, 2011) all incorporated herein by reference in their entirety. With reference to the cross-section of a composite sheet illustrated by FIG. 1, the composite 10 may be a sandwich composite including a pair of metallic layers 12 and a core layer 14 interposed between the metallic layers 12. The composite 10 illustrated in FIG. 1 generally has a uniform thickness along the length and the width of the composite. The composite 10 illustrated in FIG. 1, has generally uniform properties (e.g., generally constant tensile properties, generally constant stiffness, or both) along the length and width of the composite. The core layer 14 and the metallic layers 12 may each have a generally constant thickness. The core layer 14 may include a polymer 16 and metallic fibers 18. The metallic fibers in FIG. 1 have a width and thickness (e.g., in directions perpendicular to its length) that are relatively small compared to the thickness of the core layer. The amount of metal in the space between the metallic layers 12 at any location in the composite 10 is generally less than about 60 volume %, less than 50 volume %, or less than 40 volume %. As such, the composite 10 has limited and generally uniform metal reinforcement.

Figure 2:
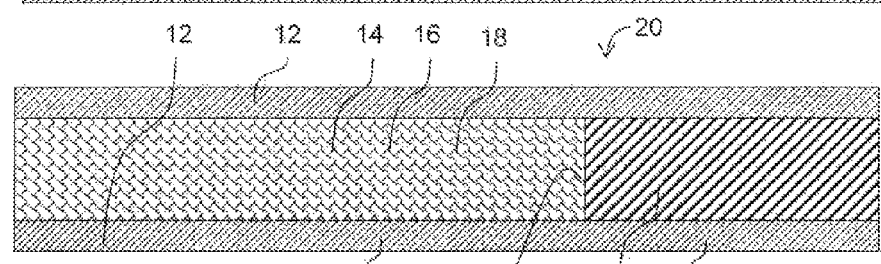
FIG. 2 is a drawing of a cross-section of an illustrative composite having a generally uniform thickness and including an insert so that the composite has regions having different properties.

The light weight composite according to the teachings herein are generally heterogeneous in that the composite has two or more regions having different cross-sections, different mechanical properties, or both. With reference to FIG. 2, a heterogeneous light weight composite 20 may have a first region 24 having a different cross-section as a second region 26. The first region 24 may include an insert 22 interposed between a pair of metallic layers 12. The second region 26 may include a core layer 14 that includes one or more polymers 16. The insert 22 preferably is formed of a material having a higher tensile strength than the tensile strength of the core layer 14. The core layer may optionally include a sufficient quantity of one or more metallic fibers 18 so that second region can be welded using a resistance welding process. As illustrated in FIG. 2, the insert 22 may contact one or both of the metallic layers 12 and/or the core layer 14 may contact one or both of the metallic layers 12. For example, the core layer 14, the insert 22, or both may span the space between the two metallic layers 12 in their respective regions. As illustrated in FIG. 2, the insert 22 may contact the core layer 14. For example, the inert 22 may contact the core layer 14 on an edge surface 23 of the insert 22. The only contact between the insert 22 and the core layer 14 may be along one edge surface 23 of the insert 22.

Figure 3:
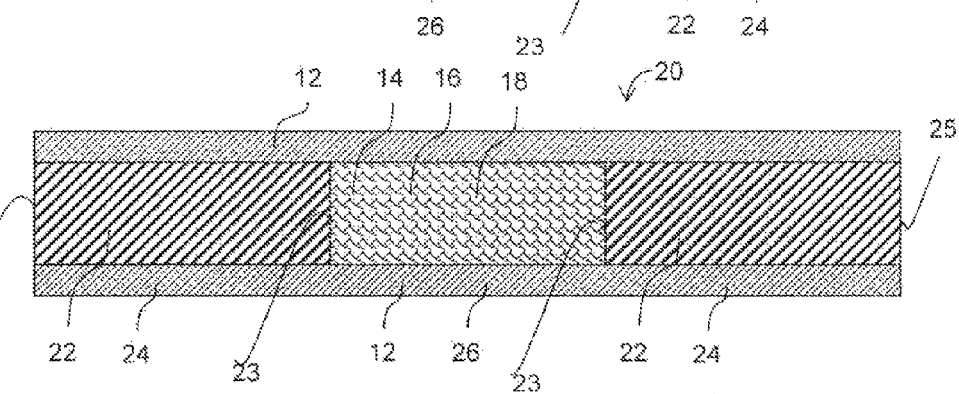
FIG. 3 is a drawing of a cross-section of an illustrative composite having a generally uniform thickness and including two inserts so that the composite has regions having different properties.
Figure 4:
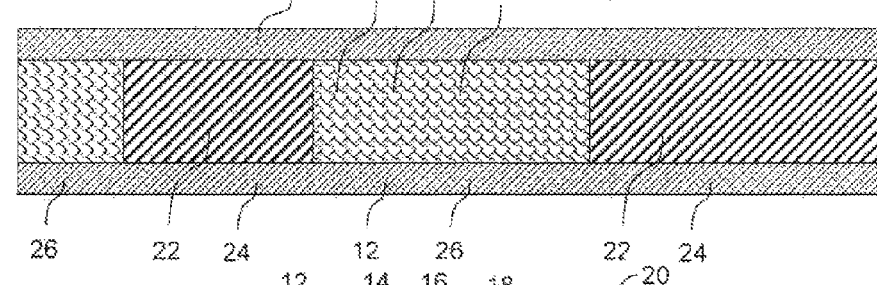
FIG. 4 is a drawing of a cross-section of an illustrative composite having a generally uniform thickness and including two inserts having different widths.

The heterogeneous light weight composite may include more than two regions, such as in the cross-section of a composite 20 illustrated in FIG. 3 including at least two regions having a relatively high tensile strength 24 and a region having a relatively low tensile strength 26. The relatively low tensile strength region 26 may separate two adjacent relatively high tensile strength regions 24. The composite 20 may include two inserts 22. One or both of the inserts 22 may span the distance between the two metallic layers 12, the core layer 14 may span the distance between the two metallic layers 12, one or both of the inserts 22 may contact the core layer 14 along the edge of the insert 22, or any combination thereof. With reference to the cross-sections illustrated in FIGS. 2, 3, 4, 5, 6, 7, and 8, the composite 20 may have a generally uniform thickness. As such, the heterogeneous properties of the composite 20 may be due primarily to (or even solely to) the differences in the materials in different regions of the composite. The heterogeneous light weight composite 20 may have an insert 22 extend to one or more edges 25 of the composite material, such as illustrated in FIG. 3. As such, the composite material may have a width that is characterized by a relatively high tensile strength along the periphery regions and a relatively low tensile strength along a central region. The composite material may include two or more relatively low tensile strength regions 26, such as illustrated in FIG. 4. For example, two adjacent relatively low tensile strength regions 26 may be separated by one or more inserts 22. The composite may include two inserts 22 having different widths, such as illustrated in FIG. 4, two core layers 14 having different widths, or both. An insert 22 may contact core layer material on two edges of the insert, such as illustrated in FIG. 4.

A composite material having two or more inserts may include that are made of the same material or different materials. For example, the composite material may include a first insert that and a second insert that have properties (e.g., tensile strength, density, thickness, or any combination thereof) that are the same or different. The material for a particular insert may be determined by a functional requirement of the composite material, which may vary from region to region of the composite material. For purpose of illustration, a first region of the composite may require a higher strength than a different region, which may be accomplished by using an insert having a higher tensile strength and/or a higher thickness in the first region compared with the insert in the different region.

Figure 5:
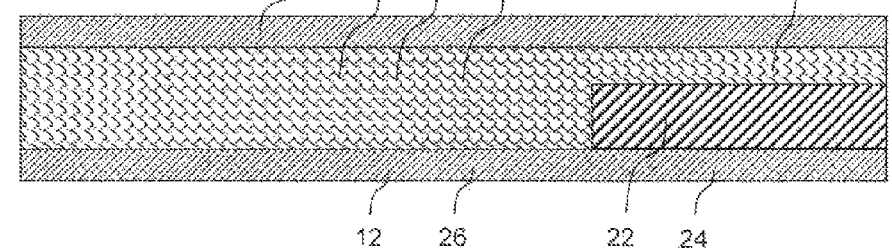
FIG. 5 is a drawing of a cross-section of an illustrative composite having a generally uniform thickness and including an insert that is attached contacts one metallic layer and does not contact the second metallic layer.
Figure 6:
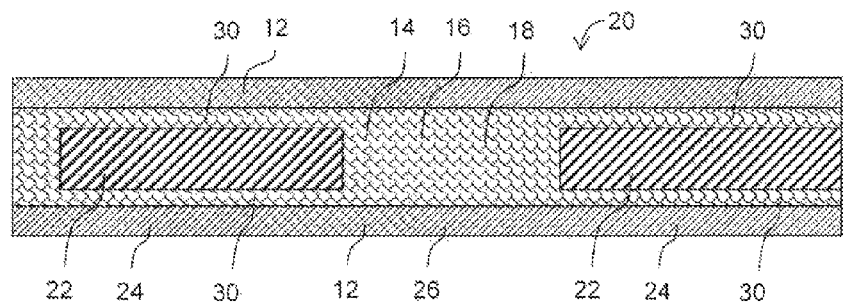
FIG. 6 is a drawing of a cross-section of an illustrative composite including an insert that does not contact a metallic layer.

Inserts 22 have a thickness less than separation distance of the metallic layers 12 in the region of the insert 24 are also contemplated, such as illustrated in FIGS. 5 and 6. For example, the insert 22 may contact only one metallic layer 12 (such as illustrated in FIG. 5), or an insert 22 may have no contact with a metallic layer 12 (such as illustrated in FIG. 6). The space between an insert 22 and a metallic layer 12 may include a polymeric material 30. The polymeric material 30 may be the same or different from the material of the core layer 14. The insert may have four surfaces in contact with either the polymeric material 30 or the core layer 14, such as illustrated in FIG. 6.

Figure 7:
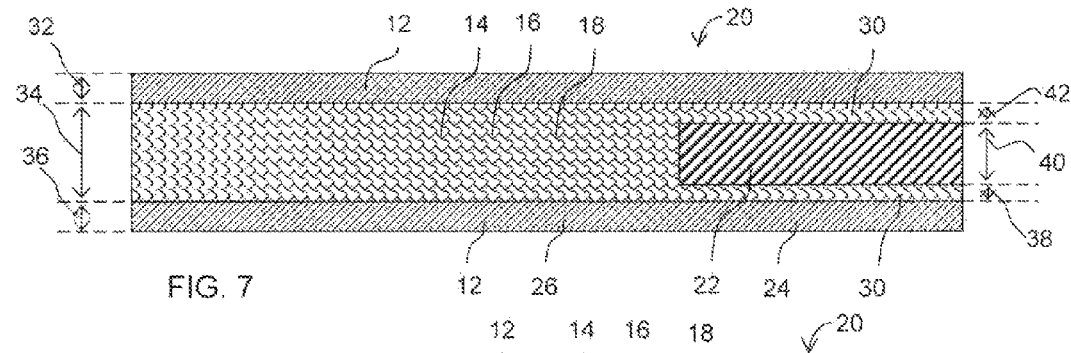
FIGS. 7-8 are drawings of cross-section of illustrative light weight composites illustrating features of the insert, metallic layers, and the core layer.
Figure 8:
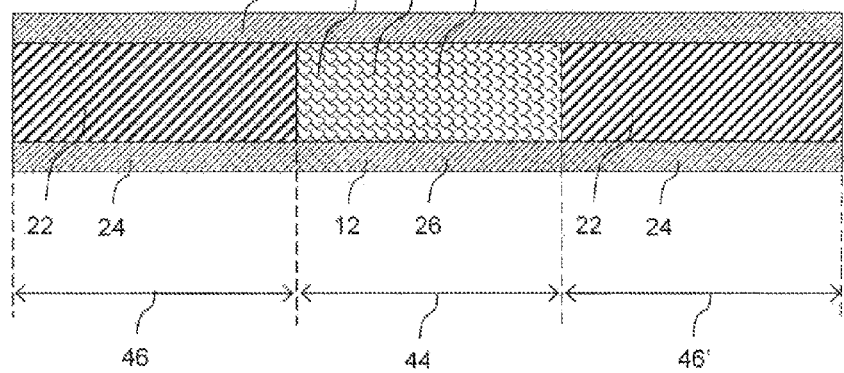

With reference to FIGS. 7 and 8, the core layer 14 may have a thickness (e.g., an average thickness) 34, a first metallic layer may have a thickness 32, and a second metallic layer may have a thickness 36. The thickness of the core layer may be sufficiently high so that the weight of the composite is generally low (e.g., at least about 5%, at least about 10%, or at least about 15% lower than the weight of a monolithic metallic material having the same dimensions and formed of the same metal as the first metallic layer and/or the second metallic layer). For example, the thickness of the core layer 34 may be greater than the thickness of the first metallic layer 32, the thickness of the second metallic layer 36, or both. Preferably, the thickness of the core layer 34 is greater than the combined thicknesses of the first and second metallic layers 32, 36. With reference to FIG. 8, the insert may have a thickness (e.g., an average thickness) 40, given by $t_i$, the separation 42 between the insert 22 and the first metallic layer 12 may be a distance, $t_{s1}$, and the separation 38 between the insert 22 and the second metallic layer 12 may be a distance, $t_{s2}$. The thickness of the insert, $t_i$, may be greater than $t_{s1}$, greater than $t_{s2}$, or greater than both. The ratio of $t_i$ to $t_{s1}+t_{s2}$, is preferably about 1 or more, more preferably about 1.5 or more, even more preferably about 2 or more, and most preferably about 3 or more. As discussed hereinbefore, $t_{s1}$, and $t_{s2}$ may each independently be about 0. It will be appreciated that an insert may be replaced with one or more sections of an insert that are in contact over one or more surfaces (e.g., two sections of an insert may be stacked, such as along the thickness of the composite; two sections of an insert may contact along an edge, such as in the width of the composite; or both). As such, inserts that are in direct contact may be treated as a single insert and may have one or any combination of the features described herein for an insert.

With reference to FIG. 8, the width 46, 46' of a region having relatively high tensile strength 24, the width of an insert 22, or both may be given by, $W_i$. The width 44 of a region having relatively low tensile strength 26, the width of a core layer 14, or the spacing between two inserts 22, may be given by, $W_c$. The total width of the inserts 22 in the composite may be $\Sigma W_i$, and the total width of the core layer may be $\Sigma W_c$. $\Sigma W_i$ is preferably sufficiently high so that the weight of the part is substantially reduced (e.g., compared with a monolithic metal having the same dimensions. The ratio of $\Sigma W_c$ to $\Sigma W_i$ may be about 0.15 or more, preferably about 0.4 or more, more preferably about 0.7 or more, even more preferably about 1.0 or more, even more preferably about 1.5 or more, and most preferably about 2.0 or more.

Figure 9:
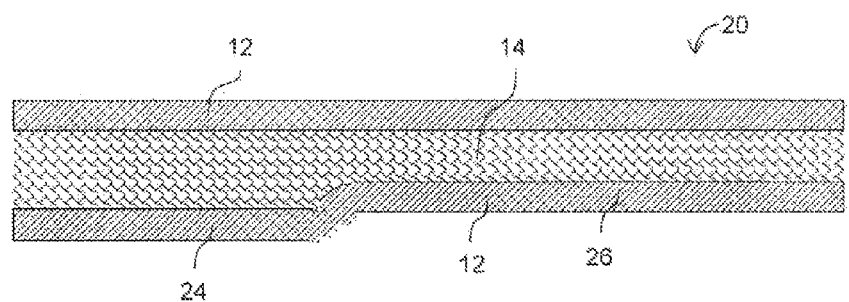
FIGS. 9, 10, 11, 12, 13, 14A, 14B; and 14C are drawings of cross-sections of illustrative lightweight composites having regions with different thicknesses.

The heterogeneous light weight composite may have two or more regions having different thicknesses, such as illustrated in cross-sections shown in FIGS. 9, 10, 11, 12, 13, 14A, 14B, and 14C. For example, the composite may include, consist essentially of, or even consist of a core layer 14 interposed between two metallic layers 12, such as illustrated in FIG. 9. With reference to FIG. 9, the thickness of the core layer 14 may vary. For example, a first region 24 may include a relatively thick core layer 14 and a second region 26 may include a relatively thin core layer. It will be appreciated that the stiffness of the composite in the region having the relatively thick core layer may be greater than the stiffness of the composite in the region having the relatively thin core layer. The ratio of the thickness of the core layer in the first region 24 to the thickness of the core layer in the second region 26, the ratio of the thickness of the composite in the first region to the thickness of the composite in the second region, or both, may be about 1 or more, about 1.1 or more, about 1.4 or more, about 1.6 or more, or about 2 or more.

Figure 10:
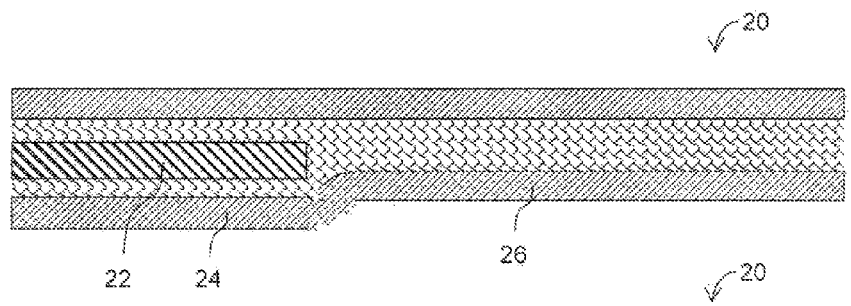
Figure 11:
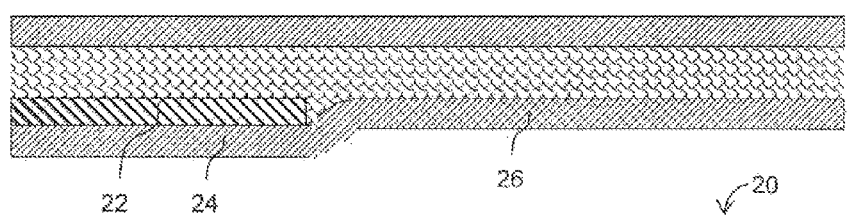
Figure 12:
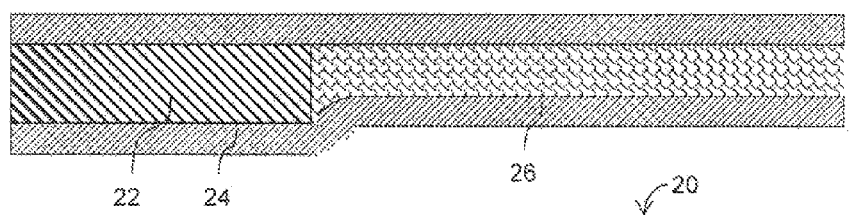
Figure 13:
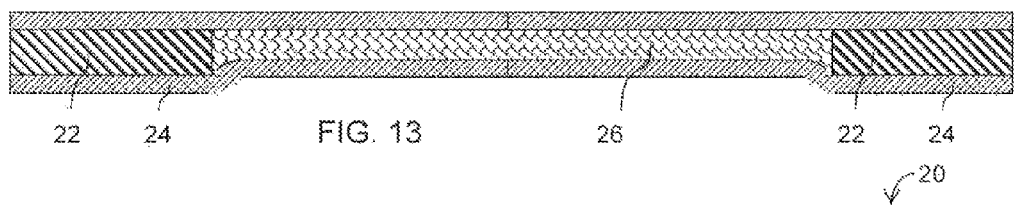

A composite 20 having regions with different thicknesses may include one or more inserts 22, such as illustrated in the cross-sections shown in FIGS. 10, 11, 12, 13, 14A, 14B, and 14C. With reference to FIGS. 10, 11, and 12, a first region having a relatively high thickness, may have a relatively high stiffness, a relatively high tensile strength, or both (e.g., compared to a region having a lower thickness and/or a region that does not include an insert). The core layer may be present throughout the width of the composite, such as illustrated in FIGS. 9, 10, and 11. If the core layer is present throughout the width of the composite, the thickness of the core layer may be generally uniform (e.g., as illustrated in FIG. 11), the thickness of the core layer may vary over a width of the composite (e.g., as illustrated in FIGS. 9 and 10), the composite layer may be divided into a plurality of layers in one or more regions (e.g., as illustrated in FIG. 10), or any combination thereof.

It will be appreciated that a composite having regions with different thickness may have one or any combination of the features described herein with respect to composites having a generally uniform thickness.

A composite having two or more regions having different thicknesses may have one or more transition regions, such as a transition region in which the thickness continuously varies (e.g., as illustrated in FIGS. 9-14).

Figure 14A:
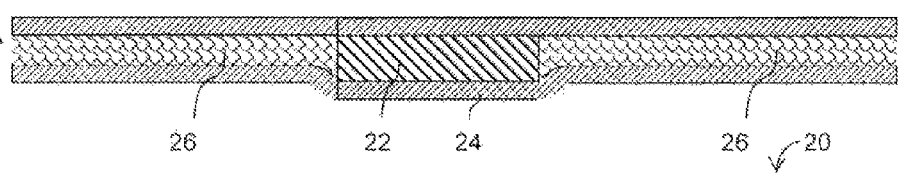
Figure 14B:
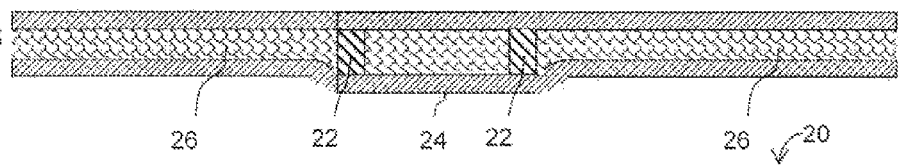

A composite having a relatively thick region and including a relatively thick core layer (e.g., polymeric core layer) may employ one or more inserts so that the relatively high thickness of the core layer in the relatively thick region is maintained (e.g., when the composite is produced), such as illustrated in FIGS. 14B. Here, the insert preferably spans the space between the two metallic layers. The width of the insert may be generally low (e.g., when the increased thickness of the core layer provides sufficient improvements in one or more mechanical properties of the composite.

Figure 14C:
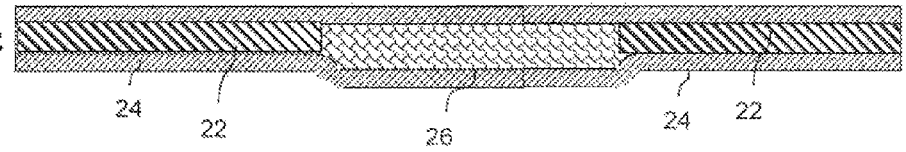

A composite may include an insert in a relatively thin region, such as illustrated in FIG. 14C. For example, a generally thick region may include, consist essentially of or consist entirely of the core layer and the metallic layers; a generally thin layer may include, consist essentially of, or consist entirely of the insert and the two metallic layers, or any combination thereof. It will be appreciated that such an approach may be employed for preparing a composite having a first region and a second region, where the first region has a tensile strength greater than the tensile strength of the second region, and the second region has a stiffness that is greater than the stiffness of the first region.

According to the teachings herein, some or all of the space between the first metallic layer and the second metallic layer includes one or more inserts and one or more polymeric layers. Preferably, a sufficient portion of the space between the two metallic layers is filled with the one or more inserts and the one or more polymeric layers so that the composite can be deformed without tearing and/or wrinkling the first metallic layer, or both. For example, the fraction of the space between the two metallic layers that includes the one or more inserts and/or the one or more polymeric layers (as measured by the projection of the inserts and polymeric layers onto the area of overlap between the first and second metallic layers, or as measured by the volume fraction of the space between the two metallic layers that is occupied by the inserts and polymeric layers) preferably is about 50% or more, more preferably about 75% or more, even more preferably about 90% or more, even more preferably about 95% or more, and most preferably about 98% or more.

As discussed, it is envisioned that composites herein may employ a sandwich structure by which a mass of a polymeric core is flanked on opposing sides by spaced apart layers. For example, a structure herein may include two sheets (e.g., metal sheets) that have a polymeric core disposed between the sheets and preferably in contact with the sheets. The polymeric core is formed of a material that includes one or more polymers, and may include one or more fillers (e.g., one or more reinforcing fillers, such as one or more metal fibers and/or one or more particulate fillers), one or more additives, and the like. The polymeric core has a density less than the density of the metal layers and reduces the weight of the composite material. The metal layers (e.g., the first metallic layer and the second metal layer) of the sandwich construction may be made of a suitable material (e.g., metal) in the form of foils or sheets or other layers having equal or unequal thickness (e.g., average thickness) across the layer. Each metallic layer (e.g., metal layer) may have a generally constant thickness or may have a thickness that varies. The face metal on each side may be made of materials having the same or different properties and be made of the same or different metals. If the metallic layers are made of metal sheets of unequal thickness, materials having different properties, or materials having different metal. The composite material may have a marking or other means of identifying and distinguishing the different metallic layers. The layers may be the same or different in composition, size (e.g., thickness, width, volume, or otherwise), shape, or other features, relative to each other layer.

Examples of metal layers that may be employed are described in paragraphs 082-091 of International Patent Application Publication WO 2010/021899 (published on Feb. 25, 2010 by Mizrahi), and paragraphs 81-86 of International Patent Application PCT/US2011/24829 (filed on Feb. 15, 2011 by Mizrahi et al.) and International Patent Application PCT/US11/45778 (filed on Aug. 15, 2011), all incorporated herein by reference. Preferred metal layers include, consist essentially of, or consist entirely of a metal or alloy including iron (e.g., including about 50 wt. % or more iron atoms), titanium, magnesium, aluminum (e.g., including about 50 wt. % or more aluminum atoms), or any combination thereof. Particularly preferred metal layers include, consist essentially of, or consist entirely of one or more steels.

Particularly preferred steel metal layers may be prepared using a process including one or more hot rolling steps, one or more cold rolling steps, one or more annealing steps, one or more cleaning steps, one or more tempering steps (e.g., a single roll, a double roll, or otherwise) or any combination thereof. Particularly preferred steel metal layers may have one or both surfaces that is bright (e.g., having a smooth finish or a lustrous smooth finish), stone (e.g., having a grindstone pattern), matte (e.g., having a satin finish or a blasted finish), or any combination thereof. The steel may be bare steel or otherwise coated, plated or treated, such as known in the art or described herein. Without limitation, a steel metal layer may include or consist essentially of, or consist entirely of tin milled black plate.

The metallic layers may have one or more surfaces plated or coated (e.g., with a thin film), or having one or more other surface treatment (e.g., a treatment that cleans, etches, roughens, or chemically modifies a surface). One or both metallic layers may have one or more coatings, platings or surface treatments that improves the adhesion of a filled polymeric material to the metal layer. The metallic layers (e.g., one or both metallic layers) may have one or more surfaces plated, coated or otherwise treated that provides corrosion resistance, improves adhesion to a paint or primer, improves stiffness, or any combination thereof. Exemplary coatings and platings may include one or any combination of galvanized, electrogalvanized, chrome plating, nickel plating, corrosion resistance treatment, e-coat, zinc coated, Granocoat, Bonazinc and the like. It will be appreciated that one or more coatings, platings, or surface treatments may be performed on the composite material, (e.g., after the composite material is prepared). As such, a surface of the metallic layer facing the filled polymeric layer may be free of a coating, plating or surface treatment and an exposed surface of the metallic layer may have a coating, plating or surface treatment. One or both metallic layers may be free of a coating, plating or surface treatment (for example, the filled polymeric material may be treated or selected so that it provides good adhesion to the metallic layer without the need for a coating, plating, or surface treatment).

One or both of the metallic layers (preferably are sufficiently thick, so that when preparing and/or processing the composite material the metallic layer does not wrinkle, tear, form other defects, or any combination thereof. Preferably, the thickness of one or both of the metallic layers is about 0.05 mm or more, more preferably about 0.10 mm or more, even more preferably about 0.15 mm or more, and most preferably about 0.18 mm or more. Preferably, the thickness of one or both metallic layers is about 30 mm or less, more preferably about 10 mm or less, even more preferably about 3 mm or less, even more preferably about 1.5 mm or less, even more preferably about 1 mm or less, and most preferably about 0.5 mm or less. For example, the composite material may be used in an automotive panel requiring at least one class A or class B surface, preferably at least one class A surface (e.g., after a stamping step, a welding step, an electrocoating step, a painting step, or any combination thereof). Such a composite material may have a first surface which is a class A surface and a second surface which is not a class A surface. The class A surface may be the surface of a first metallic layer having a relatively high thickness and the surface that optionally is not a class A surface may be the surface of a second metallic layer having a relatively low thickness (e.g., at least about 20% or even at least about 40% less than the thickness of the first metallic layer). Preferably, the ratio of the thickness (e.g., average thickness) of the first metal layer to the thickness of the second metal layer may be from about 0.2 to about 5, preferably from about 0.5 to about 2.0, more preferably from about 0.75 to about 1.33 and most preferably from about 0.91 to about 1.1. It is contemplated that some applications will require a metallic layers that differ greatly in thickness (e.g., the ratio of the thickness of the first metallic layer to the thickness of the second metallic layer may be about 0.2 or less, or about 5 or more).

Surprisingly, the filled polymeric layer may provides sufficient stiffness with respect to the flexural modulus of the composite material so that down gauging is possible, for example by employing a high strength steel for one or more metallic layers of the light weight composite material, such as described in paragraphs 120 and 121 of U.S. Provisional Patent Application No. 61/377,599 filed on Aug. 27, 2010 and in International Patent Application PCT/US11/45778 (filed on Aug. 15, 2011), both incorporated herein by reference. The first metal layer, the second metal layer, or both may include a sufficient amount of high strength steel so that the flexural modulus of the composite material is at least about 200 GPa, as measured according to ASTM D790, wherein the concentration of the filled polymeric layer is at sufficiently high so that the density of the composite material is about 0.8 $d_m$ or less, where $d_m$ is the weighted average density of the first metal layer and the second metal layer. Surprisingly such composite materials may have one or both of the following characteristics a high yield strength of about 100 MPa or more, about 120 MPa or more, about 140 MPa or more, about 170 MPa or more, about 200 MPa or more, or about 240 MPa or more); or a high tensile strength of about 160 MPa or more, about 200 MPa or more, about 220 MPa or more, about 250 MPa or more, about 270 MPa or more, about 290 MPa or more, or about 310 MPa or more.

According to the teachings herein, the light weight composite may include one or more inserts. The insert may be an insert be include, consist essentially of, or consist entirely of one or more materials having a relatively high tensile strength, a relatively high stiffness, or both (e.g., compared with the polymeric core layer described herein). The insert may includes, consists essentially of, or consists entirely of one or more material having a tensile strength greater than the tensile strength of the core layer, preferably about 20% or more greater, more preferably about 50% or more greater, even more preferably about 100% or more greater, and most preferably about 150% or more greater.

The insert may include one or more metals, one or more highly filled polymers, or both. Any of the metals or materials described herein for use in a metallic layer may be employed in an insert. Preferred inserts include, consist essentially of, or consist entirely of one or more steels, such as a steel described hereinbefore with respect to the metallic layer. Preferred highly filled polymers for use in an insert include polymers containing about 40 volume % or more filler, such as about 40 volume % or more glass filler.

As discussed herein, it may be desirable to join an insert and a metallic layer using one or more adhesives and/or one or more primers. As such, a metallic layer, an insert, or both may include one or more coatings or treatments to improve the strength and/or durability of the adhesion between the insert and a metallic layer.

The thickness of the insert preferably is sufficiently thick so that the tensile strength of the composite material in the region of the insert is increased. For example, the insert may have a thickness greater than about 0.1 mm, greater than about 0.2 mm, greater than about 0.3 mm, greater than about 0.4 mm, greater than about 0.5 mm, greater than about 0.7 mm, or greater than about 1.0 mm. The thickness of the insert may be about 20 mm or less, about 15 mm or less, about 10 mm or less, about 8: mm or less, about 6 mm or less, or about 4 mm or less. For example, the thickness of the insert may be from about 0.5 mm to about 2.0 mm. It is contemplated that inserts having a thickness greater than 20 mm may also be employed.

The width of the insert preferably is sufficiently wide so that a part can, be formed from the composite having a sufficient width of the relatively high tensile strength region so that one or more engineering needs of the part is met. For example, the insert may be sufficiently wide so that the composite can be welded to another material (employing one, two, three or more welds) in the region of the insert). The width of the insert may be about 20 mm or more, about 50 mm or more, about 80 mm or more, about 100 mm or more, about 150 mm or more, or about 200 mm or more. The insert is preferably only as wide as necessary for it to meet its one or more engineering needs so that the average density of the composite is relatively low (e.g., compared with the density of a metallic layer and/or the insert). The ratio of the total width of the one or more inserts to the total width of the composite may be about 0.9 or less, about 0.8 or less, about 0.7 or less, about 0.6 or less, about 0.5 or less, about 0.4 or less, or about 0.35 or less.

The insert may have any length. Preferably the insert has a length that is about the length of the composite.

The composite material may include a plurality of inserts. Two inserts (e.g., two adjacent inserts) may have the same shape (e.g., width, thickness, or both) or may have different shapes (e.g., width, thickness, or both). For example, two regions having generally the same tensile requirements may employ inserts that have generally the same thickness. Depending on the requirements of the inserts, the composite material may have inserts having the same properties (e.g., made from the same material) or differing in one or more properties (e.g., made from different types of material). By way of example, two inserts may differ with respect to their tensile strength, relative magnetic permeability, density, melting temperature, or any combination thereof.

A preferred insert includes or consists of a material having a sufficiently high relative magnetic permeability so that the insert can be heated using induction heating. The relative magnetic permeability of at least a portion of the insert preferably is about 50 or more, more preferably about 100 or more, even more preferably about 300 or more, even more preferably about 500 or more, even more preferably about 600 or more, and most preferably about 1000 or more.

The core layer (i.e., polymeric layer) generally includes one or more polymers. The core layer preferably has a relatively low density. For example, the density of the core layer may be less than the density of the metallic layers, less than the density of the insert (if employed), or both. The ratio of the density of the core layer to the density of the metallic layer (e.g., the first metallic layer, the second metallic layer, or both) preferably is about 0.9 or less, more preferably about 0.7 or less, even more preferably about 0.6 or less, even more preferably about 0.5 or less, and most preferably about 0.4 or less. Preferred core layers have a density of about 4.0 g/cm$^3$ or less, about 3.5 g/cm$^3$ or less, about 3.0 g/cm$^3$ or less, about 2.5 g/cm$^3$ or less, about 2.0 g/cm$^3$ or less, about 1.5 g/cm$^3$ or less, about 1.2 g/cm$^3$ or less, or about 1.0 g/cm$^3$ or less.

In various applications, the core layer may be employed only in region of the composite that are not resistance welded. As such, the core layer may have electrically insulating properties so that the one or more regions including the core layer is not capable of being welded. In other applications, the core layer may be employed in a region of the composite that requires good weldability. Here, it may be desirable for the core layer to be a filled polymeric material, preferably having relatively good electrical conductivity (e.g., compared with the polymers employed in the filled polymeric material). Exemplary filled polymeric materials that may be, employed include those described in paragraphs 27-80 of International Patent Application PCT/US2011/24829 (filed on Feb. 15, 2011 by Mizrahi et at) and in International Patent Application PCT/US11/45778 (filed on Aug. 15, 2011), both incorporated herein by reference.

The composite material may include or consist essentially of a generally uniform polymeric layer (e.g., having generally uniform composition) so that the composite material is easy to form. However, it may be advantageous to employ a plurality of different polymeric layers for achieving different properties in different regions of the composite material. For example, the composite material may include regions with polymeric layers that differ with respect to their respective concentration of metallic fibers (such as one polymeric layer that is free of metallic fibers), that differ with respect to their polymers, or both.

The core layer may have a generally uniform thickness or may have variations in its thickness. For example, a core layer may include one or more grooves, one or more channels, one or more shelves, or any combination thereof. A groove, channel or shelf may have dimensions sufficient for accommodating and or positively positioning an insert. For example the process of forming the composite may include, a step of positioning (e.g., positively positioning) an insert using a groove, channel, shelf or any combination thereof. Without limitation, the process may include a step of inserting an insert into a groove or channel or onto a shelf.

With more attention now to particular examples of polymers for use herein, the polymers used for the core layer (e.g., in the filled polymeric material) preferably include thermoplastic polymers that either have a peak melting temperature (as measured according to ASTM D3418-08) or a glass transition temperature (as measured according to ASTM D3418-08) greater than about 5° C. (preferably greater than about 80° C., even more preferably greater than about 100° C., even more preferably greater than about 120° C., more preferably greater than about 160° C., even more preferably greater than 180° C., and most preferably greater than about 205° C.). The thermoplastic polymer may have a peak melting temperature, a glass transition temperature, or both that is less than about 300° C., less than about 250° C., less than about 150° C., or even less than about 100° C. They may be at least partially crystalline at room temperature or substantially entirely glassy at room temperature. Suitable polymers (e.g., suitable thermoplastic polymers) may be characterized by one or any combination of the following tensile properties (measured according to ASTM D638-08 at a nominal strain rate of 0.1 s$^{-1}$): a tensile modulus (e.g., Young's Modulus) greater than about 30 MPa, (e.g., greater than about 750 MPa, or greater than about 950 MPa); an engineering tensile strength (i.e., $\sigma_e$), a true tensile strength (i.e., $\sigma_t$, where $\sigma_t=(1+\epsilon_e)\sigma_e$ where $\epsilon_e$ is the engineering strain), or both, greater than about 8 MPa (e.g., greater than about 25 MPa, greater than about 60 MPa, or even greater than about 80 MPa); or a plastic extension at break or elongation at failure of at least about 20% (e.g., at least about 50%, at least about 90%, or even at least about 300%). Unless otherwise specified, the term tensile strength refers to engineering tensile strength.

The polymer may preferably have strain hardening properties (e.g., a relatively high strain hardening modulus, a relatively low extrapolated yield stress, or both), such as described in International Patent Application Publication WO 2010/021899 (published on Feb. 25, 2010 by Mizrahi); see for example paragraphs 052-063, incorporated herein by reference. As such, the strain hardening properties may be measured using the method of Haward R. N., *Strain* Hardening of Thermoplastics, *Macromolecules* 1993, 26, 5860-5869, incorporated herein by reference in its entirety.

Examples of thermoplastic polymers which may be used for the polymeric layer include polyolefins (e.g. polyethylene, polypropylene or both), acetal copolymers, polyamides, polyamide copolymers, polyimides, polyesters (e.g., polyethylene terephthalates and polybutylene terephthalate), polycarbonates, thermoplastic polyurethanes, thermoplastic polyether-ester copolymers (such as a thermoplastic elastomer ether-ester material described in ASTM D 6835-08, incorporated herein by reference), acrylonitrile butadiene styrene copolymers, polystyrenes, copolymers including at least 60 wt. % of an α-olefin and at least one additional monomer (such as an ethylene copolymers including at least 80 wt. % ethylene), copolymers including any of these polymers, ionomers including any of these polymers, blends of any of these polymers, or any combination thereof.

The thermoplastic polymer may include a polyolefin, such as a polyolefin described in paragraph 065 of U.S. Provisional Patent Application 61/371,360 filed on Aug. 6, 2010 and in International Patent Application PCT/US11/45778 (filed on Aug. 15, 2011), both incorporated herein by reference. The polyolefin may be a homopolymer or a copolymer. The polyolefin may include, consisting essentially of, or consisting entirely of one or more a-olefins, such as one or more a-olefins having from about 2 to about 10 carbon atoms.

Preferable polyolefins include polypropylene homopolymers (e.g., isotactic polypropylene homopolymer), polypropylene copolymers (e.g., random polypropylene copolymers, impact polypropylene copolymer, or other polypropylene copolymer containing isotactic polypropylene), polyethylene homopolymer (e.g., high density polyethylene, or other polyethylene having a density greater than about 0.94 g/cm$^3$), polyethylene copolymers (e.g., preferably including at least about 60% ethylene, more preferably at least 80 wt. % ethylene), low density polyethylene, a blend of any of these polymers, or any combination thereof. Polypropylene homopolymers and polypropylene copolymers may be substantially free of atactic polypropylene. If present, the concentration of atactic polypropylene in the polypropylene preferably is less than about 10 wt. %. Without limitation, copolymers that may be employed include copolymers (e.g., polypropylene copolymers or polyethylene copolymers) that that consist essentially of (e.g., at least 98% by weight), or consist entirely of one or more a-olefins. More preferred polyolefins include high density polyethylene (e.g., having a density greater than about 0.945 g/cm$^3$, such as from about 0.945 to about 0.990 g/cm$^3$ or from about 0.945 to about 0.960 g/cm$^3$), low density polyethylene (e.g., a polyethylene having a sufficient concentration of long chain branches, typically greater than about 15 carbon atoms long, so that its density is about 0.945 g/cm$^3$ or less), linear low density polyethylene (e.g., a copolymer having a density of about 0.915 to about 0.930 g/cm$^3$), medium density polyethylene (e.g., a copolymer having a density of about 0.930 to about 0.945 g/cm$^3$), very low density polyethylene (e.g., having a density of about 0.900 to about 0.915 g/cm$^3$), polyethylene plastomers (e.g., a copolymer having a density of about 0.860 to about 0.900 g/cm$^3$), isotactic polypropylene homopolymer, isotactic polypropylene copolymers (e.g., having a crystallinity of about 5 wt. % or more), impact polypropylene, polypropylene block copolymers including one or more blocks of isotactic polypropylene, mixtures thereof, or any combination thereof. Even more preferred polyolefins include low density polyethylene, linear low density polyethylene, very low density polyethylene, or any combination thereof. Other polyolefins that may be used include copolymers of at least one olefin and one or more monomers that is not an olefin. For example, other polyolefins that may be employed include copolymers that include, consist essentially of, or consist entirely of i) one or more a-olefins (e.g., at least 60 wt. % of an a-olefin) and ii) one or more polar comonomers, such as a polar comonomer selected from the group consisting acrylates, (e.g., methyl acrylate, butyl acrylate, or both), vinyl acetate, acrylic acids (e.g., acrylic acid, methacrylic acid, or both), methyl methacrylate, or any combination thereof. The concentration of the comonomer may be less than about 40 wt. %, preferably less than about 25 wt. %, more preferably less than about 20 wt. %, and most preferably less than about 15 wt. % based on the total weight of the copolymer. Exemplary polyethylene copolymers that may be used include ethylene-co-vinyl acetate (i.e., "EVA", for example containing less than about 20 wt. % vinyl acetate), ethylene-co-methyl acrylate (i.e., EMA), ethylene co-methacrylic acid, or any combination thereof. Exemplary α-olefins that may be used in the copolymer include ethylene, propylene, butene, hexene, octene, or any combination thereof.

Polyamides useful in the present teachings may include polymers comprising one or more repeating units having an amide groups along the backbone of the polymer chain. For example, polyamides may be a reaction products of a diamine and a diacid. Other examples of polyamides include monadic polyamides. Generally, monadic polyamides are formed by a ring opening reaction. Exemplary polyamides which are formed from a diamine and a diacid may include polyamides (e.g., nylons) containing reaction products of either adipic acid or terephthalic acid with a diamine. Exemplary monadic polyamides include nylon 6, and polyp-benzamide). The nylon may be a homopolymer, a copolymer, or a mixture thereof. Preferred polyamide homopolymers which may be used in the present invention include nylon 3, nylon 4, nylon 5, nylon 6, nylon 6T, nylon 66, nylon 610, nylon 612, nylon 69, nylon 7, nylon 77, nylon 8, nylon 9, nylon 10, nylon 11, nylon 12, and nylon 91. Copolymers containing any of the above mentioned polyamides may also be used. Polyamide copolymers may be random copolymers, block copolymers, a combination thereof. Examples of polyamide copolymers include polymers having a plurality of different amides (i.e., a polyamide-polyamide copolymers), polyesteramide copolymers, polyetheresteramide copolymers, polycarbonate-ester amides, or any combination thereof.

A polyamide-polyamide copolymer may include two or more of the polyamides described herein for a polyamide homopolymer. Preferred polyamide-polyamide copolymers include, polyamide 6 and polyamide 66, polyamide 610, or any combination thereof. For example, a polyamide-polyamide copolymer may consist essentially of two or more polyamides selected from the group consisting of polyamide 6, polyamide 66, polyamide 69, polyamide 610, polyamide 612, and polyamide 12. More preferably the polyamide-polyamide copolymer consists essentially of two or more polyamides selected from the group consisting of polyamide 6, polyamide 66, polyamide 69, and polyamide 610. Examples of such copolymers include polyamide 6/66, polyamide 6/69, and polyamide 6/66/610. A particularly preferred polyamide-polyamide copolymer is a polyamide 6/66 copolymer. The concentration of polyamide 66 in the polyamide 6/66 copolymer may be about 90 weight percent or less, preferably about 70 weight percent or less, more preferably about 60 weight percent or less, and most preferably about 50 weight percent or less, based on the total weight of the copolymer. The concentration of polyamide 6 in the polyamide 6/66 copolymer may be about 10 weight percent or more, preferably about 30 weight percent or more, more preferably about 40 weight percent or more, and most preferably about 50 weight percent or more, based on the total weight of the copolymer. Another particularly preferred polyamide-polyamide copolymer is a random or block copolymer of a polyamide 6 and polyamide 69. Polyamide copolymers (i.e., a copolymer including one or more amide monomers) may include a polyether, such as an aliphatic ether or an aromatic ether.

It is contemplated that applications employing the composite may benefit by the inclusion of one or more fillers dispersed in the core layer. Any filler known in the art of polymer compounding may be employed. The core layer may be formed of a filled polymeric material (e.g., that contains one or more thermoplastics and one or more fillers). The fillers may include, consist essentially of, or consist of one or more reinforcing fillers, such as fibers, and more particularly metallic fibers. Metallic fillers (e.g., metallic fibers) and other fillers that may be employed are described in International Patent Application Publication WO 2010/021899 (published on Feb. 25, 2010 by Mizrahi), see for example paragraphs 064-081, incorporated herein by reference and paragraphs 52-70, FIGS. 2A, 2B, 2C, 2D, 2E, 2F, 2G, 2H, 2I, 2J, 3, and 4 of U.S. patent application Ser. No. 12/978,974 (filed on Dec. 27, 2010 by Mizrahi), and paragraphs 58-80 of International Patent Application PCT/US2011/24829 (filed Feb. 15, 2011 by Mizrahi et al), all incorporated herein by reference. For example, metallic fibers which may be used in the invention include fibers formed from metals such as steel (e.g., low carbon steel, stainless steel, and the like), aluminum, magnesium, titanium, copper, alloys containing at least 40 wt % copper, other alloys containing at least 40 wt % iron, other alloys containing at least 40 wt % aluminum, other alloys containing at least 40 wt % titanium, or any combination thereof. Preferred fibers include, consist essentially of, or consist entirely of steel. If employed, the steel of the fibers may be plain carbon steel (e.g., having a carbon concentration below about 0.2, 0.15 or even 0.08 weight %), though it may include one or more alloying, elements (e.g., Ni, Cr, or other elements for defining a stainless steel). The fibers may carry a sacrificial anode material or element, such as described hereinafter. The fibers may combine a mixture of two or more types of fibers, such as a mixture of fibers of two or more different compositions (e.g., one of the fibers may be selected for a sacrificial anode), a mixture of two or more fibers of different cross-section profiles, of different sizes, or otherwise.

The filled polymeric material may contain other non-metallic conductive fibers, such as those described in International Patent Application Publication WO 2010/021899 (published on Feb. 25, 2010 by Mizrahi).

The metallic fibers preferably are selected so that the composite material has generally good weld characteristics. For example, the concentration of the metallic fibers, the size of the metallic fibers, the amount of contact between the metallic fibers, the shape of the metallic fibers, the amount of contact between a metallic fiber and the metal layers, or any combination thereof of may be selected so that the composite material (e.g., a region of the composite material where the core includes the metallic fibers) has a generally good weld processing window, a generally high electrical conductivity, a generally low static contact resistance, or any combination thereof. A generally good weld processing window may be characterized for example by a high weld current range, a high weld time range, or both. The weld current range and the static contact resistance of the composite material may have features and may be measured according to the method described in paragraphs 111-117 of U.S. Provisional Patent Application No. 61/377,599 filed on Aug. 27, 2010 and paragraphs 013, 016, 023, 034-039, 076-080, 121-126 and FIGS. 5-8 of U.S. patent application Ser. No. 12/978,974, filed on Dec. 27, 2010, and in International Patent Application PCT/US11/45778 (filed on Aug. 15, 2011), all incorporated herein by reference.

The metallic fibers preferably may have dimensions and distribution of dimensions as described in International Patent Application Publication WO 2010/021899 (published on Feb. 25, 2010 by Mizrahi). Without limitation, the metallic fibers may have a weight average length, $L_{avg}$, greater than about 1 mm, more preferably greater than about 2 mm, and most preferably greater than about 4 mm. Suitable fibers may have an $L_{avg}$ of less than about 200 mm, preferably less than about 55 mm, more preferably less than about 30 mm, and most preferably less than about 25 mm. The weight average diameter of the fibers may be greater than about 0.1 μm, more preferably greater than about 1.0 μm, and most preferably greater than about 4 μm. The weight average diameter of the fiber may be less than about 300 μm, preferably less than about 50 μm, even more preferably less than about 40 μm, and most preferably less than about 30 μm.

The metallic fibers may have any shape. The metallic fibers may include a curvilinear portion. Generally linear metallic fibers may be used. More preferably the metallic fibers are not straight fibers. By way of example, metallic fibers that are not straight, may have one or more bends, may have a generally arcuate profile, may have a generally helical shape, or any combination thereof. Metallic fibers that are initially straight, preferably become fibers that are not straight (such as described above) when combined with the polymer.

The metallic fibers may have one or more features described in paragraphs 099-102, 157, and FIG. 5 of U.S.

Provisional Patent Application 61/371,360 filed on Aug. 6, 2010, incorporated herein by reference. For example, the cross-section of the metallic fiber (i.e., in the direction transverse to the length of the fiber) may have one or more flat sides. As such, a portion of a metallic fiber in the composite may have a planar contact with a metallic layer, with another fiber, or both. The metallic fiber may have a cross-section that is generally a polygonal having four or more sides, such as a cross-section that is generally rectangular, generally a parallelogram, or generally a square. Such fibers thus may be configured generally as elongated flat ribbon strips. The ratio of the length (e.g., the average length) to the width (e.g. the weighted average width) of the ribbon strips may be about 2 or more, about 4 or more, about 8 or more, or about 15 or more. The ratio of the length (e.g., the average length) to the width (e.g. the weighted average width) of the ribbon strips may be about 5000 or less, about 1000 or less, about 400 or less, about 100 or less, or about 30 or less. The ratio of the width (e.g., the weighted average width) to the thickness (e.g., the weighted average thickness) of the fibers may be 1 or more, about 1.4 or more about 2 or more, about 3 or more, about 5 or more, or about 7 or more. The ratio of the width to the thickness of the fibers may be about 300 or less, about 100 or less, about 50 or less, or about 15 or less. Such fibers may be prepared by one or more fiber forming steps, such as a step of cutting a metallic foil (e.g., having a thickness that is about the thickness of the fibers) into narrow ribbon strips (e.g., the spacing between cuts may define the width of the fibers).

The cross-section of the metallic fibers, perpendicular to the length of the fiber, may have any geometry. For example, the cross-section may be a polygon (such as a rectangle or square) or other shape having generally straight sides, or the cross-section may include at least one side that is generally arcuate (for example, the metallic fibers may have a cross-section that is entirely arcuate, such as a substantially circular, or substantially oval shaped cross-section). The cross-sectional area of the metallic fibers in the plane transverse to the longitudinal axis preferably is about $1 \times 10^{-6}$ mm$^2$ or more, more preferably about $1 \times 10^{-5}$ mm$^2$ or more, even more preferably about $8 \times 10^{-5}$ mm$^2$ or more, even more preferably about $1 \times 10^{-4}$ mm$^2$ or more, and most preferably about $4 \times 10^{-4}$ mm$^2$ or more. The cross-sectional area of the metallic fibers in the plane transverse to the longitudinal axis preferably is about $2.5 \times 10^{-2}$ mm$^2$ or less, more preferably about $1 \times 10^{-2}$ mm$^2$ or less, even more preferably about $2.5 \times 10^{-3}$ mm$^2$ or less, and most preferably about $1 \times 10^{-3}$ mm$^2$ or less. For example, it is surprising that composite materials employing steel fibers having a cross-sectional area in the plane transverse to the longitudinal axis that are greater than about $8 \times 10^{-5}$ mm$^2$ have improved weld process window relative to materials having fibers with lower cross-sectional area. Such composite materials, including the fibers having a cross-sectional area greater than about $8 \times 10$ mm$^2$ maintain the high drawability and formability observed found for the composite materials with thinner fibers.

The metallic fibers may have a substantially constant thickness across the length of the fiber, across the width of the fiber, or both. A flat surface of the fiber may be smooth (i.e., generally free of texture), or may have a texture. For example a ribbon-like fiber may have both major surfaces that are smooth, both major surfaces that are textured, or one major surface that is textured and one major surface that is smooth.

A particularly preferred metallic fiber that may be used, optionally with one or more other fibers, is a steel fiber (e.g., a carbon steel fiber) having a generally rectangular cross-section (e.g., for defining a profile for the generally flat ribbon strips) in the direction transverse to the length. The metallic fiber may have a weighted average thickness of about 10 to about 70 μm, a weighted average width of about 40 to about 200 μm, a weighted average length of about 0.8 to about 5 mm, or any combination thereof.

When used in the polymeric layer (e.g., the core layer) between two metallic layers, the metallic fibers preferably are present as a mass of fibers. The mass of metallic fibers preferably includes a large number of individual fibers. The mass of metallic fibers may be interconnected. Preferably some or all of the mass of metallic fibers is generally free of permanent interconnections. The mass of metallic fibers may be entangled. The mass of fibers may form mechanical interlocks (i.e., two or more fibers may be mechanically interlocked). The mass of metallic fibers preferably spans with thickness of polymeric layer so that the mass of fibers (e.g., the network of metallic fibers) electrically connects the two metallic layers. Although a single metallic fiber may span the thickness of the polymeric layer, preferably none of the metallic fibers span the thickness of the polymeric layer. If metallic fibers span the thickness of the polymeric layer, the fraction of the fibers that span, the thickness preferably is about 0.4 or less, more preferably about 0.20 or less, even more preferably about 0.10 or less, even more preferably about 0.04 or less, and most preferably about 0.01 or less. The fibers in the mass of fibers preferably are arranged in a non-ordered arrangement. For example, the maximum number of neighboring metallic fibers that are arranged in a generally aligned arrangement may be less than about 100, preferably less than about 50, more preferably less than about 20, even more preferably less than about 10, and most preferably less than about 5. More preferably the mass of fibers are arranged in a generally random arrangement. Individual metallic fibers that contact a surface of one of the metallic layers preferably are free of a planar contact (e.g., over the length of the fiber). As such, the composite material may be characterized as being essentially free, or even entirely free of planar contacts between a metallic fiber and a metallic layer. Fibers that contact a metallic surface, preferably have a line contact, a point contact, or a combination, thereof. Some of the metallic fibers may contact one of the metallic layers, however few, if any of the metallic fiber will contact a metallic layer over a large portion of the length of the metallic fiber. As such, a large fraction of the metallic fibers do not contact a metallic layer or at least have a significant portion that is not in contact with the metallic layer. The fraction of the metallic fibers that contact a metallic layer along at least half of the length of the fiber is preferably about 0.3 or less, more preferably about 0.2 or less, even more preferably about 0.1 or less, even more preferably about 0.04 or less, and most preferably about 0.01 or less.

The metallic fibers are preferably sufficiently thin and present in a sufficient concentration so that many fibers are arranged between the surfaces of the layer. For example, the average number of fibers that intersect a line parallel to the thickness direction of the polymeric layer and going through the polymeric layer preferably is about 3 or more, more preferably about 5 or more, more preferably about 10 or more, and most preferably about 20 or more. Without being bound by theory, it is believed that a large number of metallic fibers advantageously allows for more homogeneous deformation of the material, such as during a stamping process.

The concentration of the metallic fibers is preferably greater than about 1 volume %, more preferably greater than about 3 volume %, even more preferably greater than about 5 volume %, even more preferably greater than about 7 volume %, even more preferably greater than about 10 volume %, and most preferably greater than about 12 volume % based on the total volume of the filled polymeric material. The metallic fibers may be present in the filled polymeric material at a concentration less than about 60 volume %, preferably less than about 50 volume %, more preferably less than about 35 volume %, still more preferably less than about 33 volume %, and most preferably less than about 30 volume % (e.g., less than about 25 volume %, or even less than about 20, 10, or 5 volume %). For example the amount of fiber may be about 1%, 2%, 3%, 4%, 5%, 6%, 7%, 8%, 9%, or 10%, by volume based on the total volume of the filled polymeric material, or within a range bounded by those values (such as from about 1% to about 6%). It is possible that composites herein may employ a concentration of metallic fibers that surprisingly is substantially lower than the amount of a particle filler necessary to achieve similar welding characteristics. Moreover, it is also possible that the fibers and materials are selected so that better welding performance surprisingly may be realized at a relatively low concentration of metallic fibers as compared with an identical composite material having a higher concentration of metallic fibers. For example, it is surprisingly seen that using a filled polymeric material having about 10 volume % metallic fiber results in composite materials having superior welding characteristics compared with those made with filled polymeric materials having higher concentrations of metallic fiber.

The thermoplastic polymer material may be present in the filled polymeric material at a concentration greater than about 40 volume %, preferably greater than about 65 volume %, more preferably greater than about 67 volume %, still more preferably greater than about 70 volume %, and most preferably greater than about 75 volume % (e.g., at least about 80 volume %, at least about 90 volume %, or even at least about 95 volume %).

The volume ratio of the polymer (e.g., the thermoplastic polymer) to the fibers (e.g., the metallic fibers) is preferably greater than about 2.2:1, more preferably greater than about 2.5:1, and most preferably greater than about 3:1. The volume ratio of the polymer (e.g., the thermoplastic polymer) to the fibers (e.g., the metallic fibers) is preferably less than about 99:1, more preferably less than about 33:1, even more preferably less than about 19:1, and most preferably less than about 9:1, (e.g., less than about 7:1).

The first region and the second region may have one or more properties that are different. Preferably, the first region and the second region differ with respect to density, ultimate tensile strength, stiffness, yield stress, ultimate elongation, or any combination thereof. The ratio of the ultimate tensile strength (e.g., as measured according to ASTM E-8) of the first region to the second region is preferably about 1.1 or more, more preferably about 1.2 or more, even more preferably about 1.5 or more, even more preferably about 2.0 or more, and most preferably about 3.0 or more. The ratio of the yield strength (e.g., as measured according to ASTM E-8) of the first region to the yield strength of the second region is preferably about 1.1 or more, more preferably about 1.2 or more, even more preferably about 1.5 or more, even more preferably about 1.8 or more, and most preferably about 2.0 or more. The ratio of the yield density of the first region to the density of the second region is preferably about 1.2 or more, more preferably about 1.4 or more, even more preferably about 1.8 or more, even more preferably about 2.0 or more, and most preferably about 2.5 or more.

Light Weight Composite Sheet/Coil

The light weight composite may be in the form of a sheet. For example the light weight composite may be capable of being in a coil, such as a coil wound lengthwise. The sheet (e.g., the coil) may have cross-sections perpendicular to its length (e.g., at different linear positions) that are generally the same. Preferably, the sheet or coil has a generally uniform cross-section perpendicular to its length. For example, the coiled composite material may include a pair of metallic sheets (such as a pair of metallic outer sheets) that extend the length of the coiled material, one or more inserts that extend the length of the coiled material, one or more polymeric core layers that extend the length of the coiled material. The one or more polymeric core layers preferably are interposed between the pair of metallic sheets and directly or indirectly attached to the pair of metallic sheets. The one or more inserts preferably are interposed, between the pair of metallic sheets and directly or indirectly attached to the pair of metallic sheets. The cross-section preferably includes a first region that includes an insert, and a second region that does not include the insert. As such, the width of an insert, the total width of the inserts, or both, may be about 90% or less, about 80% or less, about 70% or less, about 60% or less, about 50% or less, or about 40% or less, or about 30% or less, based on the total width of the sheet (e.g., of the coil). The width of an insert, the total width of the inserts, or both, preferably is about 1% or more, more preferably about 4% or more, based on the total width of the sheet. The cross-sectional area of an insert, the total cross-sectional area of all of the inserts, or both, measured in a plane perpendicular to the length of the sheet, may be about 80% or less, about 70% or less, about 60% or less, about 50% or less, about 40% or less, about 30% or less, or about 20% or less, based on the total cross-sectional area of the sheet. Thus measured, the cross-sectional area of an insert, the total cross-sectional area of all of the inserts, or both, preferably is about 2% or more, more preferably about 5% or more, based on the total cross-sectional area of the sheet.

The composite materials according to the teachings herein may be made by a batch process (such as a molding process) or a continuous process. By way of example, a molding process may include a step of injecting a polymer (e.g., injecting a molten polymer) between two outer metallic layers, or may include a step of arranging a solid polymer layer between two outer metallic layers and then applying heat for melting the polymer (e.g. in a compression molding operation). A preferred process is a continuous process, such as a process that employs one or more coils of metal sheet, one or more coils of a polymer sheet, or any combination thereof. For example, a continuous process may include a step of uncoiling a first metal sheet, a second metal sheet, and a polymer sheet so that the polymer sheet is interposed between the first and second metal sheets. The process may include a step of uncoiling a third metal coil having a width less than the width of the first metal sheet and the second metal sheet so that the third metal sheet is interposed between the first metal sheet and the second metal sheet. The process may include one or more steps of heating one or more of the sheets (e.g., for melting the polymer, for adhering the polymer to one or more of the metal sheets, or any combination thereof). It will be appreciated that instead of using a coil of a polymeric sheet, the process may includes a step of heating (e.g., melting) a polymeric material for extruding, calendaring, or otherwise forming a polymeric sheet; placing the polymeric sheet between the two outer metal sheets (e.g. while the polymer is in a melt state, or otherwise); and adhering the polymeric sheet to the one or both of the outer metal sheets.

It will be appreciated that the process may employ one or more steps of providing a compressive pressure to at least a portion (or even all) of the composite. By way of example, a compressive force may be applied using a pair of rolls, such as a pair of counter-rotating rolls, and passing at least a portion (or all of) of the composite between the rolls. The spacing between the rolls may be the same distance as, or preferably less than the thickness of the portion of the composite being compressed by the rolls. During the step of passing at least a portion (or all of) of the composite between a pair of rolls one or any combination of the following steps may occur: a step of densifying the composite material, a step of adhering a polymeric layer to one or more metallic layers, a step of adhering a composite layer to an insert, or a step of flowing at least some of the polymeric layer. A heated roll (such as a roll having a temperature of about 80° C. or more, about 110° C. or more, or about 125° C. or more) may be employed to provide heat to a composite (e.g., for melting and/or softening a polymer, for cross-linking a polymer, or both). A chilled roll (such as a roll having a temperature of about 75° C. or less, about 50° C. or less, about 30° C. or less, or about 20° C. or less) may be employed for cooling the composite (e.g., for crystallizing a polymer, for cooling a polymer below its glass transition temperature, and the like). The process may employ a plurality of pairs of rolls. For example, the process may employ a pair of rolls for compressing a relatively thick region of the composite and another pair of rolls for compressing a relatively thin region of the composite, where the two pair of rolls have different spacings. The process may include a roll or a pair of rolls (which may be the same or different from a roll employed for compressing at least a portion of the material) for controlling the temperature of the material (e.g., by heating or cooling the material). Other approaches for compressing a composite having varying thickness include: employing a pair of rolls having varying spacing between the rolls, or employing a pair of rolls having non-parallel axial angles. It will be appreciated that the process may include a step of passing the composite between a first pair of rolls (e.g., for compressing one region of the composite), and a step of passing the composite between a second pair of rolls (e.g., for compressing a different region of the composite), such as a second pair of rolls differing from the first pair of rolls with respect to spacing between the rolls, in the axial angle between the rolls, or both.

The process may include a step of attaching (e.g., joining) one or both outer metal sheets to an insert. The insert may be attached to an outer layer using a primer or adhesive, using a polymeric material, by melting some or all of the insert (e.g., one or more surfaces of the insert) and/or a sheet to which it is being attached (such as by employing a step of induction heating, resistance welding, brazing, or laser welding), or any combination thereof. An insert may be attached to an outer layer by laser welding, wherein at least a portion of the insert and a portion of a metallic layer are melted using energy from the light of a laser. An insert may be attached to a metallic layer by applying an electrical current across the thickness of the sheet to heat an interface between the insert and a metallic layer (e.g., so that the insert and the metallic layer are fused together). An insert, the first metallic layer, the second metallic layer, or any combination thereof may have one or more surfaces coated with a metal or metal (E.g., a zinc coating) so that a metallic layer and the insert are capable of being attached by a brazing step. A particularly preferred method for joining an insert and a metallic layer (or both metallic layers) includes a step of heating one or more components (e.g., an insert, an metallic layer, or both) using induction heating. In addition to the aforementioned steps, the method for joining may include a step of: feeding the composite through a pair of rollers, applying a compressive pressure to the composite using the rollers, heating the composite with the rollers, transferring heat to the rollers using a heat transfer fluid, applying a current through the composite using the rollers (e.g., the rollers may be electrodes for brazing and/or welding), applying an high frequency magnetic field for induction heating, or any combination thereof. Preferably, the insert and/or another component positioned in the region of the insert includes (e.g., as a core layer; at or near one or more surfaces that face an outer metal sheet, or both) or consists essentially of a material having a relative magnetic permeability that is sufficiently high (e.g., a relative magnetic permeability of about 50 or more, about 100 or more, about 300 or more, about 500 or more, about 600 or more, or about 1000 or more) so that the insert can be easily heated using a high frequency magnetic field.

The insert may be attached to one or both metallic layers using a conductive polymeric adhesive. The conductive polymeric adhesive may be a polymeric composition employed in the polymeric layer with the proviso that the composition adheres to the insert, the metallic layer, or preferably both. The conductive polymeric adhesive may include one or any fillers described hereinbefore with respect to the polymeric layer. For example, the conductive polymeric adhesive may include a metal particle, a metal fiber, carbon black, graphite, or any combination thereof. If employed, the conductive polymeric adhesive preferably is employed as a generally thin layer. A layer of the conductive polymeric adhesive has a thickness that is preferably about 0.2 mm or less, more preferably about 0.1 mm or less, even more preferably about 0.04 mm or less, and most preferably about 0.02 mm or less.

The composite materials of the present invention may be used in any number of applications requiring one or any combination of the properties described herein, including but not limited to relatively low density, relatively low thermal conductivity, relatively high stiffness to density ratio, relatively low acoustical transmission, or heterogeneous mechanical and/or physical properties. Exemplary applications which may employ the composite materials of the present invention may include automotive and other transportation related applications, building construction related applications, and appliance related applications. The composite materials may be used in applications such as an automotive panel, a truck panel, a bus panel, a container (e.g., a container used for shipping), a panel on a train car, a panel on a jet, a tube (e.g., a bicycle tube), a motorcycle panel (e.g., cowling or fairing), a trailer panel, a door inner (e.g., a vehicle door inner), a roof panel, a vehicle hood inner, a vehicle floor pan, a vehicle rear shelf panel, a vehicle rear compartment panel, a vehicle back seat pane, a vehicle decklid inner, a panel on a recreational vehicle, a panel on a snowmobile, an automotive bumper fascia, a spoiler, a wheel well liner, an aerodynamic ground effect, an air dam, a container, a bed liner, a divider wall, an appliance housing, a vehicle fuel, filler door, a vehicle bumper, a decorative insert, a duct, a grab bar, a storage compartment door, a housing for an electronic device (such as a cellular phone, a computer, a camera, a tablet computer, a music or video storage device, or a music or video player), a console, an air inlet part, a battery housing, a grille, a wheel well, or a seat pan. The composite materials may be used as a building construction material, such as an exterior trim element, flashing, gutters, shingles, walls, flooring, countertops, cabinet facing, window frames, door frames, paneling, vents, ducts, planking, framing studies, shelving, plumbing fixtures, sinks, shower pans, tubs, and enclosures. An exemplary application is an vehicle body panel (e.g., a body outer skin of a vehicle such as an automobile). Automobile panels which may use the composite materials described herein include front quarter panels, rear quarter panels, door panels, hood panels, roof panels, or otherwise. The automotive panel may have a class A, class B, or class C surface, preferably a class A or class B surface, and more preferably a class A surface.

EXAMPLES

Comparative Example 1

A tailor-welded blank is prepared by laser welding the edge of a first sheet of monolithic steel having a uniform thickness of about 1.0 mm to the edge of a second sheet of monolithic steel having a uniform thickness of about 0.8 mm. The two sheets each have a generally cubic shape. The first steel sheet and the second steel sheet have about the same length and are formed from the same metal. The sheets are attached along an edge that is defined by the length of the sheets and the thickness of each sheet. The weight of the tailor-welded blank is measured as a function of the percent of the width of the tailor-welded blank that is formed from the first sheet (i.e., form the 1 mm thick sheet).

Example 2

Figure 15:
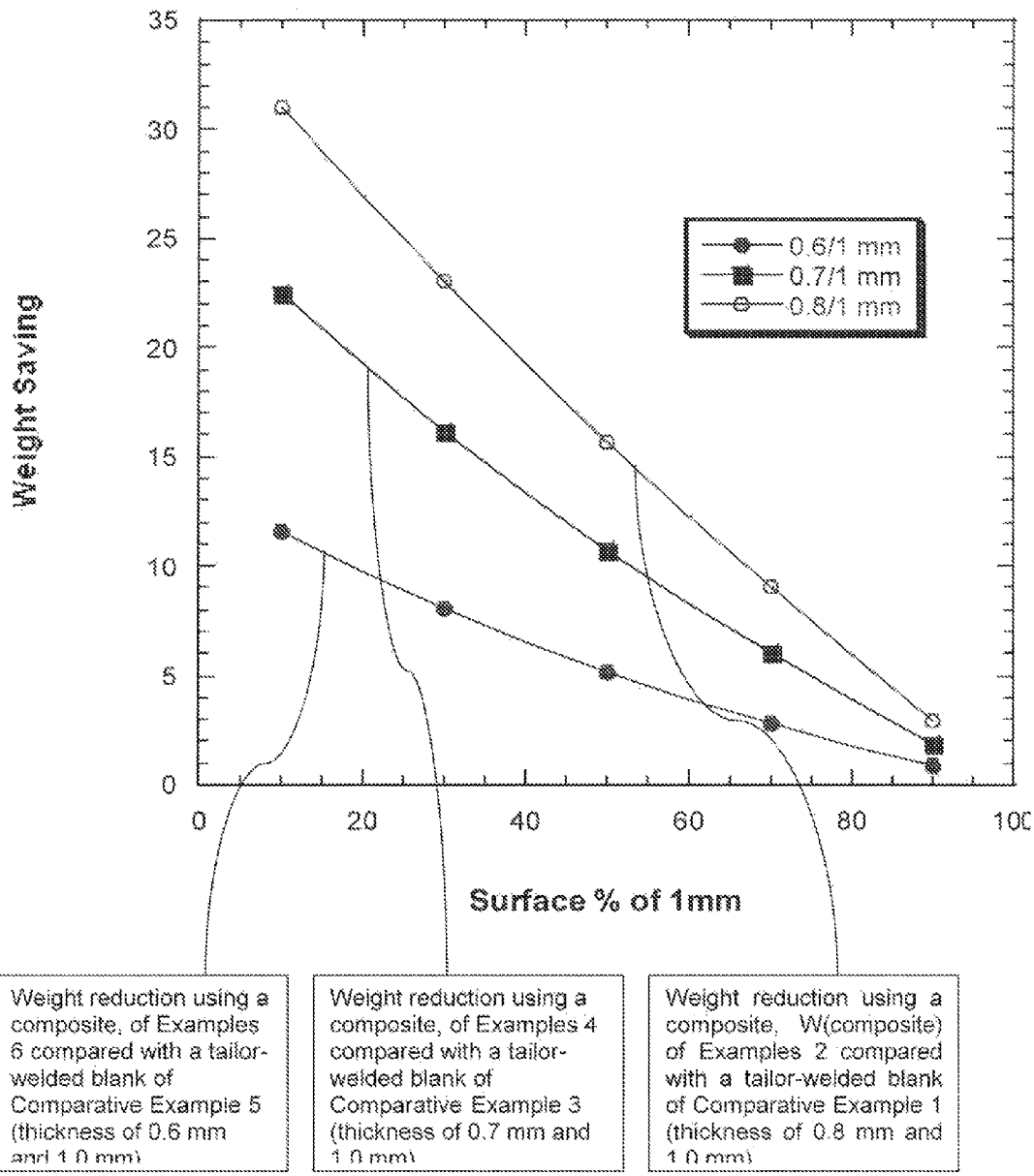
FIG. 15 is a plot showing the reduction in the weight of a composite material, according to the teachings herein, relative to a tailor-welded blank made by laser welding two monolithic metal sheets.

Example 2 is a sandwich composite consisting of a first region having a uniform thickness of about 1 mm and a second region having a uniform thickness of about 0.8 mm. The first region and the second region have the same two outer layers, but different in the core material between the outer layers. The outer layers each have a uniform thickness of about 0.2 mm. In the first region, the core material is a monolithic metal sheet having a uniform thickness of about 0.6 mm. In the second region, the core material is a polymeric material having a generally uniform thickness of about 0.4 mm. The first region has a length and width that is the same as the length and width of the first metal sheet of comparative example 1. The second region has a length and width that are the same as the length and width of the second metal sheet of comparative example 1. The outer sheets and the insert are all formed of the same metal as the metal sheets of Comparative Example 1. The weight of Example 2 is measured as a function of the percent of the width of the Example 2 that is formed from the first region (i.e., from the region having a thickness of about 1 mm and includes the insert). The weight savings (in units of % weight reduction) is determined by dividing the difference in Weight of Example 2 and Comparative example 1 by the weight of Comparative Example 1. The weight savings is shown in FIG. 15 as a function of the percent of the width of the sample that has a thickness of 1 mm.

Comparative Example 3

Comparative Example 3 is prepared using the same method as Comparative Example 1, except the second steel sheet is replaced by a generally cubic sheet having a thickness of about 0.7 mm, and about the same width and length as the second steel sheet of Comparative Example 1. The weight of the tailor-welded blank is measured as a function of the percent of the width of the tailor-welded blank that is formed from the first sheet (i.e., form the 1 mm thick sheet).

Example 4

Example 4 is a sandwich composite consisting of a first region having a uniform thickness of about 1 mm and a second region having a uniform thickness of about 0.7 mm. Example 4 is prepared using the same materials as Example 2, except the core material in the second region has a generally uniform thickness of about 0.3 mm. The weight of Example 4 is measured as a function of the percent of the width of the Example 4 that is formed from the first region (i.e., from the region having a thickness of about 1 mm and includes the insert). The weight savings (in units of % weight reduction) is determined by dividing the difference in weight of Example 4 and Comparative example 3 by the weight of Comparative Example 3. The weight savings is shown in FIG. 15 as a function of the percent of the width of the sample that has a thickness of 1 mm.

Comparative Example 5

Comparative Example 5 is prepared using the same method as Comparative Example 1, except the second steel sheet is replaced by a generally cubic sheet having a thickness of about 0.6 mm, and about the same width and length as the second steel sheet of Comparative Example 1. The weight of the tailor-welded blank is measured as a function of the percent of the width of the tailor-welded blank that is formed from the first sheet (i.e., form the 1 mm thick sheet).

Example 6

Example 6 is a sandwich composite consisting of a first region having a uniform thickness of about 1 mm and a second region having a uniform thickness of about 0.6 mm. Example 6 is prepared using the same materials as Example 2, except, the core material in the second region has a generally uniform thickness of about 0.2 mm. The weight of Example 6 is measured as a function of the percent of the width of the Example 6 that is formed from the first region (i.e., from the region having a thickness of about 1 mm and includes the insert). The weight savings (in units of % weight reduction) is determined by dividing the difference in weight of Example 6 and Comparative example 5 by the weight of Comparative Example 5.

The weight savings of Examples 2, 4, and 6 relative to Comparative Examples 1, 3, and 5 are shown in FIG. 15 as a function of the percent of the width of the sample having a thickness of 1 mm. As illustrated in FIG. 15 (for a fixed percent of the width having a thickness of 1 mm), the weight of Example 2 is less than the weight of Comparative Example 1, the weight of Example 4 is less than the weight of Comparative Example 3, and the weight of Example. 6 is less than the weight of Comparative Example 5. As such, the composite materials have a lower weight than tailor-welded blanks having the same thicknesses.

What is claimed is:
1. A light weight composite including:
   i) a first metallic sheet having a thickness of about 0.05 mm to about 30 mm;
   ii) a second metallic sheet having a thickness of about 0.05 mm to about 30 mm;
   iii) one or more metallic inserts, including a first insert interposed between the first metallic sheet and the second metallic sheet; and
   iv) a polymeric layer interposed between the first metallic sheet and the second metallic sheet, wherein the polymeric layer has a thickness greater than the thickness of the first metallic sheet;
   wherein the polymeric layer includes a thermoplastic polymer;
   the light weight composite includes a first region having the first insert interposed between the first metallic sheet, wherein the first region has a relatively high thickness; and the light weight composite includes a second region having a thickness less than the thickness of the first region;

wherein the ratio of the thickness of the first region to the thickness of the second region is 1.1 or more.

2. The light weight composite of claim 1, wherein the second region is characterized as being free of the one or more metallic inserts interposed between the first metallic sheet and the second metallic sheet; or the second region includes a second insert interposed between the first metallic sheet and the second metallic sheet, wherein the second insert is one of the metallic inserts and has a thickness that is less than the thickness of the first insert in the first region.

3. The light weight composite of claim 2, wherein the composite includes about 15 volume % or more of the polymeric layer, based on the total volume of the composite;

the composite includes a sufficient amount of the polymeric layer so that the composite has a density that is about 5% or more lower than the density of an identical material except the polymeric layer is replaced by the material of the lighter of the first metallic layer and the second metallic layer;

or both.

4. The light weight composite of claim 1, wherein the number of the metallic inserts in the composite is two.

5. The light weight composite of claim 1, wherein the first region is capable of being welded using a resistance welding method.

6. The light weight composite of claim 1, wherein the polymeric layer includes a sufficient concentration of the metallic fibers so that the composite can be welded in a region including the polymeric layer.

7. The light weight composite of claim 1, wherein the first region has a tensile strength at least 10% higher than the tensile strength of the second region.

8. The light weight composite of claim 1, wherein the first metallic sheet and the second metallic sheet have an overlap area, and about 95% or more of the overlap area includes the first insert and/or the polymeric layer present between the two metallic sheets; and the composite is substantially free of a polymeric material between the insert and the first metallic sheet, the composite is substantially free of the polymeric material between the first insert and the second metallic sheet, or both.

9. The light weight composite of claim 1, wherein the first insert contacts the first metallic sheet, the first insert contacts the second metallic sheet, or both.

10. The light weight composite of claim 1, wherein the first insert is attached to the first metallic sheet, the first insert is attached to the second metallic sheet, or both.

11. The light weight composite of claim 1, wherein the first metallic layer, the second metallic layer, the first insert, or any combination thereof include a high strength steel; and the width of the first insert is about 20 mm or more.

12. The light weight composite of claim 1, wherein the polymeric layer has a width and the light weight composite has a width, wherein the width of the polymeric layer is about the same as the width of the light weight composite.

13. The light weight composite of claim 1, wherein the first insert is attached to one or more metallic sheets by an adhesive, by a weld, by a braze, by a primer, or any combination thereof;

the second region is characterized as being free of the one or more metallic inserts interposed between the first metallic sheet and the second metallic sheet;

the composite includes about 15 volume % or more of the polymeric layer, based on the total volume of the composite;

the composite includes a sufficient amount of the polymeric layer so that the composite has a density that is about 5% or more lower than the density of an identical material except the polymeric layer is replaced by the material of the lighter of the first metallic layer and the second metallic layer;

the first region is capable of being welded using a resistance welding method;

the first region has a tensile strength at least 10% higher than the tensile strength of the second region;

the first metallic sheet and the second metallic sheet have an overlap area, and about 95% or more of the overlap area includes the first insert and/or the polymeric layer present between the two metallic sheets;

the composite is substantially free of the polymeric layer between the insert and the first metallic sheet, the composite is substantially free of the polymeric layer between the insert and the second metallic sheet, or both;

the first metallic layer, the second metallic layer, the insert, or any combination thereof includes a steel; and the width of the insert is about 20 mm or more.

14. A part or component formed of a composite material of claim 1.

15. The light weight composite of claim 1, wherein the first metallic insert has a thickness greater than 0.2 mm, a width of 20 mm or more, and a length equal to a length of the light weight composite.

16. The light weight composite of claim 15, wherein the first layer includes steel, the second metallic layer includes steel, and the first metallic insert includes steel.

17. The light weight composite of claim 15, wherein the first insert is spaced apart from the first metallic layer so that the first insert does not contact the first metallic layer.

18. The light weight composite of claim 15, wherein the number of the one or more metallic inserts is 1.

19. A light weight composite including:

i) a first metallic sheet;

ii) a second metallic sheet, wherein the first metallic sheet and the second metallic sheet are made of a material having the same properties and the same metals;

iii) one or more metallic inserts interposed between the first metallic sheet and the second metallic sheet; and iv) a polymeric layer interposed between the first metallic sheet and the second metallic sheet;

wherein the polymeric layer includes a thermoplastic polymer;

the light weight composite includes a first region having an insert interposed between the first metallic sheet, wherein the first region has a relatively high thickness; and the light weight composite includes a second region having a thickness less than the thickness of the first region;

wherein the ratio of the thickness of the first region to the thickness of the second region is 1.1 or more.

* * * * *